United States Patent
Peng et al.

(10) Patent No.: US 12,382,481 B2
(45) Date of Patent: Aug. 5, 2025

(54) COMMUNICATION METHOD AND DEVICE

(71) Applicant: Huawei Technologies Co., Ltd., Shenzhen (CN)

(72) Inventors: Wenjie Peng, Shanghai (CN); Jun Wang, Shanghai (CN); Mingzeng Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 971 days.

(21) Appl. No.: 17/214,541

(22) Filed: Mar. 26, 2021

(65) Prior Publication Data

US 2021/0219299 A1 Jul. 15, 2021

Related U.S. Application Data

(63) Continuation of application No. PCT/CN2019/108762, filed on Sep. 27, 2019.

(30) Foreign Application Priority Data

Sep. 28, 2018 (CN) .......................... 201811139492.7

(51) Int. Cl.
*H04W 72/04* (2023.01)
*H04W 4/40* (2018.01)
(Continued)

(52) U.S. Cl.
CPC ............. *H04W 72/53* (2023.01); *H04W 4/40* (2018.02); *H04W 8/24* (2013.01); *H04W 72/02* (2013.01); *H04W 72/23* (2023.01); *H04W 76/15* (2018.02)

(58) Field of Classification Search
CPC ....... H04W 4/46; H04W 72/40; H04W 72/02; H04W 76/15; H04W 8/24
See application file for complete search history.

(56) References Cited

U.S. PATENT DOCUMENTS 10,091,707 B2 10/2018 Lee et al.
10,299,180 B2 5/2019 Hong et al.
(Continued)

FOREIGN PATENT DOCUMENTS

| CN | 106105059 A | 11/2016 |
|---|---|---|
| CN | 106559732 A | 4/2017 |

(Continued)

OTHER PUBLICATIONS

"Mode-3 Sensing and Reporting for Resource Pool Sharing," Agenda Item: 9.10.3.1, Source: Huawei, HiSilicon, Document for: Discussion and Decision, 3GPP TSG-RAN WG2 Meeting #102, R2-1808314, Revision of R2-1805349, Busan, Korea, May 21-25, 2018, 4 pages.

(Continued)

*Primary Examiner* — Romani Ohri
(74) *Attorney, Agent, or Firm* — SLATER MATSIL, LLP

(57) ABSTRACT

A communication method and devoice, the method including receiving, by a terminal device, indication information sent by a radio access network device, where the indication information is generated by the radio access network device based on configuration information that is used by the terminal device to transmit service data on a sidelink, and where the configuration information include any one or more of a technology type, an air interface, a radio access technology, and a mode that are used by the terminal device to transmit the service data on the sidelink, wherein the sidelink is a wireless communication link between the terminal device and another terminal device, and transmitting, by the terminal device, the service data on the sidelink based on the indication information.

8 Claims, 7 Drawing Sheets

(51) Int. Cl.
*H04W 8/24* (2009.01)
*H04W 72/02* (2009.01)
*H04W 72/23* (2023.01)
*H04W 72/53* (2023.01)
*H04W 76/15* (2018.01)

(56) References Cited

U.S. PATENT DOCUMENTS

| | | |
|---|---|---|
| 2018/0234889 A1 | 8/2018 | Baghel et al. |
| 2019/0052446 A1* | 2/2019 | Cheng ............... H04W 72/0453 |
| 2020/0228257 A1* | 7/2020 | Baldemair ............ H04L 1/1614 |
| 2020/0287665 A1* | 9/2020 | Lee ........................ H04L 1/1874 |
| 2020/0383100 A1* | 12/2020 | Yu .......................... H04W 72/02 |
| 2021/0006954 A1 | 1/2021 | Xu et al. |
| 2021/0168589 A1* | 6/2021 | Yasukawa ............. H04W 72/04 |
| 2021/0204250 A1* | 7/2021 | Ashraf ................... H04W 76/14 |
| 2021/0377806 A1* | 12/2021 | Osawa ................... H04W 28/18 |

FOREIGN PATENT DOCUMENTS

| | | |
|---|---|---|
| CN | 106998575 A | 8/2017 |
| CN | 108260163 A | 7/2018 |
| IN | 107347219 A | 11/2017 |
| WO | 2017135881 A1 | 8/2017 |
| WO | 2017204995 A1 | 11/2017 |
| WO | 2018149265 A1 | 8/2018 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.3.0, Sep. 2018, 918 pages.

3rd Generation Partnership Project; Technical Specification Group Radio Access Network; NR; Radio Resource Control (RRC) protocol specification (Release 15), 3GPP TS 38.331 V15.3.0, Sep. 2018, 445 pages.

"Overview of V2X Features and Specification Impact," Agenda item: 7.2.8.2, Source: Samsung,Document for: Discussion and Decision, 3GPP TSG RAN WG1 Meeting #82, R1-154190, Beijing, China, Aug. 24-28, 2015, 3 pages.

"Discussion on NR Uu Based Resource Allocation/Configuration for LTE Sidelink," Source: ZTE, Agenda item: 7.2.4.3.2, Document for: Discussion and Decision, 3GPP TSG RAN WG1 Meeting #94, R1-1808607, Gothenburg, Sweden, Aug. 20-24, 2018, 2 pages.

"New SID: Study on NR V2X," Source: Vodafone, Document for: Approval, Agenda Item: 9.1.5, 3GPP TSG RAN Meeting #80, RP-181429, La Jolla, USA, Jun. 11-14, 2018, 5 pages.

* cited by examiner

COMMUNICATION METHOD AND DEVICE

CROSS-REFERENCE TO RELATED APPLICATIONS

This application is a continuation of International Application No. PCT/CN2019/108762, filed on Sep. 27, 2019, which claims priority to Chinese Patent Application No. 201811139492.7, filed on Sep. 28, 2018. The disclosures of the aforementioned applications are herein incorporated by reference in their entireties.

TECHNICAL FIELD

Embodiments of this application relate to the field of communications technologies, and in particular, to a communication method and a device.

BACKGROUND

A V2X (vehicle-to-everything) service is a type of communications service for information exchange of vehicle-to-everything. In a V2X scenario, data of the V2X service may be transmitted in a sidelink manner through a PC5 interface between terminal devices, or may be directly transmitted to a base station through a Uu interface. In a current discussion process of R15 LTE V2X (R15 long term evolution (LTE) V2X), some physical layer features are introduced in a standard, for example, higher-order modulation and transmit diversity. However, these features are not compatible with an R14 LTE V2X terminal device. This means that if a V2X terminal device transmits data of a V2X service by using a new R15 physical layer feature, not all V2X terminal devices can receive the data. For example, an R14 LTE V2X terminal device cannot perform parsing. However, for data of some V2X services, for example, basic security-related information, it is expected that all the V2X terminal devices can receive and parse the data. In this way, for these services, the data needs to be sent in a manner that is compatible with all the V2X terminal devices. Currently, two sets of tx profiles (configuration modes for transmitting data) are defined in the standard. A tx profile 1 is as follows. A terminal device shall use a Rel-14 compatible format (use a Rel-14 MCS table, not to use a Rel-15 feature). That is, the terminal device uses the R14 compatible format. In other words, the terminal device uses the R14 MCS (modulation and coding scheme) table, and does not use the R15 feature. A tx profile 2 is as follows. A terminal device shall use a Rel-15 format that is not compatible with Rel-14 (where rate matching is used, and Rel-15 MCS table is used). That is, the terminal device uses the R15 format that is not compatible with R14. In other words, the R15 MCS table is used for rate matching.

The tx profile is of a service granularity. In other words, all data corresponding to the service is sent by using a tx profile selected by a core network device. When a V2X application layer of the terminal device sends the data of the V2X service to an AS (access stratum) layer of the terminal device, the V2X application layer also indicates the tx profile of the service, and the terminal device sends the data of the V2X service in a corresponding format based on the indication. In the prior art, a core network device is allowed to determine only a tx profile of a service, but the core network is not aware of a real-time status of a sidelink. In this way, the tx profile is equivalent to one static configuration. Consequently, transmission quality of the service may not be satisfied.

SUMMARY

Embodiments of this application provide a communication method and a device, to improve transmission quality of a service.

According to a first aspect, a communication method is provided. The communication method is used for a radio access network device or a chip in a radio access network device. For example, the communication method provided in this embodiment of this application is as follows. A radio access network device obtains configuration information, where the configuration information is used by a terminal device to transmit service data on a sidelink, and the configuration information includes any one or more of the following configuration parameters: a technology type, an air interface, a radio access technology, and a mode that are used by the terminal device to transmit the service data on the sidelink, where the sidelink is a wireless communication link between the terminal device and another terminal device, and the radio access network device generates indication information based on the configuration information, and the radio access network device sends the indication information to the terminal device, to indicate the terminal device to transmit the service data on the sidelink based on the indication information.

In this way, in the prior art, a core network device statically configures a tx profile for the terminal device, and in this application, the radio access network device first obtains the configuration information used by the terminal device to transmit the service data on the sidelink. For example, the configuration information may be configured by the core network device for the terminal device or configured by the radio access network device for the terminal device based on a request of the terminal device. Because the radio access network device can sense a real-time status of the sidelink, the radio access network device may send the indication information to the terminal device based on the configuration information with reference to the real-time status of the sidelink. In this way, the terminal device transmits the service data on the sidelink based on the indication information, to improve transmission quality of the service.

Optionally, that a radio access network device obtains configuration information includes the radio access network device receives the configuration information sent by the core network device, or the radio access network device receives the configuration information sent by the terminal device, where the configuration information is sent by the core network device to the terminal device.

Optionally, before configuring the configuration information for the terminal device, the core network device needs to know a V2X capability supported by the radio access network device and/or a V2X capability supported by the terminal device. Therefore, before that a radio access network device obtains configuration information, the method further includes the radio access network device reports the V2X capability supported by the radio access network device to the core network device, where the V2X capability supported by the radio access network device includes the technology type supported by the radio access network device, and/or the radio access network device sends, to the core network device, the V2X capability that is supported by the terminal device and that is reported by the terminal device, where the V2X capability supported by the terminal device includes the technology type supported by the terminal device or a feature of a V2X technology supported by the terminal device, and the feature of the V2X technology supported by the terminal device includes any one or more of the following, including a modulation and decoding technology, an encoding technology, an encryption technology, carrier aggregation CA, and dual connectivity DC that are supported by the V2X technology, where the configuration information is determined by the core network device based on the V2X capability supported by the radio access network device and/or the V2X capability supported by the terminal device.

Optionally, when any one of the configuration parameters included in the configuration information includes at least two candidate parameters, that the radio access network device generates the indication information based on the configuration information, and sends the indication information to the terminal device includes the radio access network device determines a target candidate parameter in the at least two candidate parameters, and the radio access network device sends the indication information carrying the target candidate parameter to the terminal device, and/or the radio access network device sends the indication information carrying a resource configuration corresponding to the target candidate parameter to the terminal device.

Optionally, when any one of the configuration parameters included in the configuration information includes at least two candidate parameters, that the radio access network device generates the indication information based on the configuration information, and sends the indication information to the terminal device includes the radio access network device generates a candidate parameter selection rule based on the configuration information, where the candidate parameter selection rule is used to indicate the terminal device to select a target candidate parameter from the at least two candidate parameters, and the radio access network device sends the indication information carrying the candidate parameter selection rule to the terminal device.

Optionally, when any one of the configuration parameters included in the configuration information includes at least two candidate parameters, that the radio access network device generates the indication information based on the configuration information, and sends the indication information to the terminal device includes the radio access network device determines a candidate parameter used by each part of data, and the radio access network device sends the indication information carrying a resource configuration corresponding to the candidate parameter used by each part of data to the terminal device.

Optionally, when the core network device does not configure the configuration information for the terminal device, the core network device may configure the configuration information for the terminal device through the radio access network device, specifically comprises before that a radio access network device obtains configuration information, the method further includes the radio access network device receives service configuration request information sent by the terminal device, where the service configuration request information is used to indicate service information, and the service information includes a service type and/or a quality of service (QOS) requirement, and that a radio access network device obtains configuration information includes the radio access network device generates the configuration information based on the service configuration request information.

According to a second aspect, a communications apparatus is provided. The communications apparatus is a radio access network device or a chip in a radio access network device. For example, the communications apparatus includes an obtaining unit, a processing unit, and a sending unit. Functions implemented by the units and modules provided in this application are specifically as follows.

The obtaining unit is configured to obtain configuration information, where the configuration information is used by a terminal device to transmit service data on a sidelink, and the configuration information includes any one or more of the following configuration parameters, including a technology type, an air interface, a radio access technology, and a mode that are used by the terminal device to transmit the service data on the sidelink, where the sidelink is a wireless communication link between the terminal device and another terminal device. The processing unit is configured to generate indication information based on the configuration information obtained by the obtaining unit. The sending unit is configured to send the indication information generated by the processing unit to the terminal device, so that the terminal device transmits the service data on the sidelink based on the indication information. For beneficial effects of the second aspect, refer to the analysis of the beneficial effects in the first aspect. Details are not described herein again.

Optionally, the obtaining unit is specifically configured to receive the configuration information sent by a core network device, or receive the configuration information sent by the terminal device, where the configuration information is sent by the core network device to the terminal device.

Optionally, the sending unit is further configured to report a V2X capability supported by the radio access network device to the core network device, where the V2X capability supported by the radio access network device includes the technology type supported by the radio access network device, and/or the sending unit is further configured to send, to the core network device, a V2X capability that is supported by the terminal device and that is reported by the terminal device, where the V2X capability supported by the terminal device includes the technology type supported by the terminal device or a feature of a V2X technology supported by the terminal device, and the feature of the V2X technology supported by the terminal device includes any one or more of the following, including a modulation and decoding technology, an encoding technology, an encryption technology, carrier aggregation (CA), and dual connectivity (DC) that are supported by the V2X technology, where the configuration information is determined by the core network device based on the V2X capability supported by the radio access network device and/or the V2X capability supported by the terminal device.

Optionally, when any one of the configuration parameters included in the configuration information includes at least two candidate parameters, the processing unit is specifically configured to determine a target candidate parameter in the at least two candidate parameters, and the sending unit is specifically configured to send the indication information carrying the target candidate parameter determined by the processing unit to the terminal device, and/or the sending unit is specifically configured to send the indication information carrying a resource configuration corresponding to the target candidate parameter determined by the processing unit to the terminal device.

Optionally, when any one of the configuration parameters included in the configuration information includes at least two candidate parameters, the processing unit is specifically configured to generate a candidate parameter selection rule based on the configuration information, where the candidate parameter selection rule is used to indicate the terminal device to select a target candidate parameter from the at least two candidate parameters, and the sending unit is specifically configured to send the indication information carrying the candidate parameter selection rule generated by the processing unit to the terminal device.

Optionally, when any one of the configuration parameters included in the configuration information includes at least two candidate parameters, the processing unit is specifically configured to determine a candidate parameter used by each part of data, and the sending unit is specifically configured to send the indication information carrying a resource configuration corresponding to the candidate parameter that is used by each part of data and that is determined by the processing unit to the terminal device.

Optionally, a receiving unit is configured to receive service configuration request information sent by the terminal device, where the service configuration request information is used to indicate service information, and the service information includes a service type and/or a QoS requirement, where the obtaining unit is specifically configured to generate the configuration information based on the service configuration request information received by the receiving unit.

According to a third aspect, a communication method is provided. The communication method is used for a user equipment terminal device or a chip in a terminal device. For example, the communication method provided in this embodiment of this application is as follows. The terminal device receives indication information sent by a radio access network device, where the indication information is generated by the radio access network device based on configuration information that is used by the terminal device to transmit service data on a sidelink, and the configuration information includes any one or more of the following configuration parameters, including a technology type, an air interface, a radio access technology, and a mode that are used by the terminal device to transmit the service data on the sidelink, where the sidelink is a wireless communication link between the terminal device and another terminal device, and the terminal device transmits the service data on the sidelink based on the indication information. In this way, in the prior art, a core network device statically configures a tx profile for the terminal device, and in this application, the radio access network device first obtains the configuration information used by the terminal device to transmit the service data on the sidelink. For example, the configuration information may be configured by the core network device for the terminal device or configured by the radio access network device for the terminal device based on a request of the terminal device. Because the radio access network device can sense a real-time status of the sidelink, the radio access network device may send the indication information to the terminal device based on the configuration information with reference to the real-time status of the sidelink. In this way, the terminal device transmits the service data on the sidelink based on the indication information, to improve transmission quality of the service. In this way, in the prior art, a core network device statically configures a tx profile for the terminal device, and in this application, the radio access network device first obtains the configuration information used by the terminal device to transmit the service data on the sidelink. For example, the configuration information may be configured by the core network device for the terminal device or configured by the radio access network device for the terminal device based on a request of the terminal device. Because the radio access network device can sense a real-time status of the sidelink, the radio access network device may send the indication information to the terminal device based on the configuration information with reference to the real-time status of the sidelink. In this way, the terminal device transmits the service data on the sidelink based on the indication information, to improve transmission quality of the service.

Optionally, before that the terminal device receives indication information sent by a radio access network device, the method further includes the terminal device receives the configuration information sent by a core network device, and the terminal device sends the configuration information to the radio access network device.

Optionally, before that the terminal device receives the configuration information sent by a core network device, the method further includes the terminal device reports a V2X capability supported by the terminal device to the core network device, where the V2X capability supported by the terminal device includes the technology type supported by the terminal device or a feature of a V2X technology supported by the terminal device, and the feature of the V2X technology supported by the terminal device includes any one or more of a modulation and decoding technology, an encoding technology, an encryption technology, carrier aggregation CA, and dual connectivity DC that are supported by the V2X technology, where the configuration information is generated by the core network device based on the V2X capability supported by the terminal device. The indication information includes a resource configuration used by the terminal device to transmit the service data on the sidelink, and that the terminal device transmits the service data on the sidelink based on the indication information includes the terminal device transmits the service data on the sidelink based on the resource configuration.

Optionally, when any one of the configuration parameters included in the configuration information includes at least two candidate parameters, the indication information includes a target candidate parameter determined by the radio access network device in the at least two candidate parameters, and that the terminal device transmits the service data on the sidelink based on the indication information includes the terminal device transmits the service data on the sidelink by using the target candidate parameter.

Optionally, when any one of the configuration parameters included in the configuration information includes at least two candidate parameters, the indication information is used to indicate a candidate parameter selection rule, and that the terminal device transmits the service data on the sidelink based on the indication information includes the terminal device selects a target candidate parameter from the at least two candidate parameters according to the candidate parameter selection rule, and the terminal device transmits the service data on the sidelink by using the target candidate parameter.

Optionally, before that the terminal device receives indication information sent by a radio access network device, the method further includes the terminal device sends service configuration request information to the radio access network device, where the service configuration request information is used to indicate service information, and the service information includes a service type and/or a QoS requirement, and the configuration information is generated by the radio access network device based on the service configuration request information.

Optionally, before that the terminal device receives indication information sent by a radio access network device, the method further includes the terminal device sends service configuration request information to a core network device, where the service configuration request information is used to indicate service information, and the service information includes a service type and/or a QOS requirement, and the configuration information is generated by the core network device based on the service configuration request information.

According to a fourth aspect, a communications apparatus is provided. The communications apparatus is a terminal device or a chip in a terminal device. For example, the communications apparatus includes a receiving unit and a sending unit. Functions implemented by the units and modules provided in this application are as follows.

The receiving unit is configured to receive indication information sent by a radio access network device, where the indication information is generated by the radio access network device based on configuration information that is used by the terminal device to transmit service data on a sidelink, and the configuration information includes any one or more of the following configuration parameters, including a technology type, an air interface, a radio access technology, and a mode that are used by the terminal device to transmit the service data on the sidelink, where the sidelink is a wireless communication link between the terminal device and another terminal device. The sending unit is configured to transmit the service data on the sidelink based on the indication information received by the receiving unit.

For beneficial effects of the fourth aspect, refer to the analysis of the beneficial effects in the third aspect. Details are not described herein again.

Optionally, the receiving unit is further configured to receive the configuration information sent by a core network device, and the sending unit is configured to send the configuration information to the radio access network device.

Optionally, the sending unit is further configured to report a V2X capability supported by the terminal device to the core network device, where the V2X capability supported by the terminal device includes the technology type supported by the terminal device or a feature of a V2X technology supported by the terminal device, and the feature of the V2X technology supported by the terminal device includes any one or more of the following, including a modulation and decoding technology, an encoding technology, an encryption technology, CA, and DC that are supported by the V2X technology, where the configuration information is generated by the core network device based on the V2X capability supported by the terminal device.

Optionally, the indication information includes a resource configuration used by the terminal device to transmit the service data on the sidelink, and the sending unit is specifically configured to transmit the service data on the sidelink based on the resource configuration.

Optionally, when any one of the configuration parameters included in the configuration information includes at least two candidate parameters, the indication information includes a target candidate parameter determined by the radio access network device in the at least two candidate parameters, and the sending unit is specifically configured to transmit the service data on the sidelink by using the target candidate parameter.

Optionally, when any one of the configuration parameters included in the configuration information includes at least two candidate parameters, the indication information is used to indicate a candidate parameter selection rule, and the sending unit is specifically configured to select a target candidate parameter from the at least two candidate parameters according to the candidate parameter selection rule, and transmit the service data on the sidelink by using the target candidate parameter.

Optionally, the sending unit is further configured to send service configuration request information to the radio access network device, where the service configuration request information is used to indicate service information, and the service information includes a service type and/or a QoS requirement, and the configuration information is generated by the radio access network device based on the service configuration request information.

Optionally, the sending unit is further configured to send service configuration request information to a core network device, where the service configuration request information is used to indicate service information, and the service information includes a service type and/or a QOS requirement, and the configuration information is generated by the core network device based on the service configuration request information.

According to a fifth aspect, a communications apparatus is provided. The communications apparatus includes one or more processors and a communications interface. The communications interface is coupled to the one or more processors. The communications apparatus communicates with another device through the communications interface. The processor is configured to execute computer program code in a memory, and the computer program code includes an instruction, so that the communications apparatus performs the communication methods according to the first aspect, the third aspect and the possible implementations of the first aspect and the third aspect.

According to a sixth aspect, a computer-readable storage medium is further provided. The computer-readable storage medium stores an instruction. When the instruction is run on a communications apparatus, the communications apparatus is enabled to perform the communication methods according to the first aspect, the third aspect, and the possible implementations of the first aspect and the third aspect.

According to a seventh aspect, a computer program product including an instruction is further provided. When the computer program product runs on a communications apparatus, the communications apparatus is enabled to perform the communication methods according to the first aspect, the third aspect, and the possible implementations of the first aspect and the third aspect.

According to an eighth aspect, an embodiment of this application further provides a chip system. The chip system includes a processor, configured to support a communications apparatus in implementing the foregoing communication method. In a possible design, the chip system further includes a memory. The memory is configured to store a program instruction and data that are needed for implementing a function of the communications apparatus. Certainly, the memory may alternatively not exist in the chip system. The chip system may include a chip, or may include a chip and another discrete device. This is not specifically limited in this embodiment of this application.

According to a ninth aspect, a communications system is provided. The communications system includes a terminal device and a radio access network device. The terminal device includes any communications apparatus provided in the second aspect, and the radio access network device includes any communications apparatus provided in the fourth aspect.

In this application, a name of the communications apparatus does not constitute any limitation to devices or function modules. During actual implementation, these devices or the function modules may have other names. Provided that functions of the devices or the function modules are similar to those in this application, the devices or the function modules fall within the scope of the claims in this application and their equivalent technologies.

For detailed descriptions of the fifth aspect, the sixth aspect, the seventh aspect, the eighth aspect, the ninth aspect, and the implementations thereof in this application, refer to the detailed descriptions of the first aspect to the fourth aspect and the implementations thereof. In addition, for beneficial effects of the fifth aspect, the sixth aspect, the seventh aspect, the eighth aspect, the ninth aspect, and the implementations thereof, refer to the analysis of the beneficial effects in the first aspect to the fourth aspect and the implementations thereof. Details are not described herein again.

These aspects or other aspects in this application are more concise and comprehensible in the following descriptions.

BRIEF DESCRIPTION OF THE DRAWINGS

To describe technical solutions in embodiments of the present invention or in the prior art more clearly, the following briefly describes the accompanying drawings needed for describing the embodiments.

DETAILED DESCRIPTION OF ILLUSTRATIVE EMBODIMENTS

The following clearly and completely describes technical solutions in embodiments of the present invention with reference to the accompanying drawings in the embodiments of this application.

In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, unless otherwise specified, "a plurality of" in the descriptions of this application means two or more than two. In addition, to clearly describe the technical solutions in the embodiments of this application, the terms "first", "second", and the like in the embodiments of this application are intended to distinguish between different objects, or are intended to distinguish between different processing of a same object, but are not intended to describe a particular order of the objects.

A V2X service is a type of communication service for information exchange of vehicle-to-everything. Usually, data of the V2X service is transmitted by using 3GPP. V2X specifically includes V2I (vehicle to infrastructure), V2N (vehicle to network), V2P (vehicle to pedestrian), and V2V (vehicle to vehicle). In the V2I service, one participant is a terminal device, and another participant is a roadway infrastructure, for example, a roadside unit (RSU). In the V2N service, one participant is a terminal device, and another participant is a service entity. For example, when communication is performed through a network device, the service entity is an application server or a radio access network device connected to the application server. Two participants in either of the V2P service and the V2V service are both terminal devices. The data of the V2X service may be transmitted through a PC5 interface or a Uu interface (air interface). The PC5 interface is usually an air interface used for end-to-end data transmission between devices such as terminal devices, and the Uu interface is usually an air interface used for data transmission between a terminal device and a radio access network device.

Figure 1:
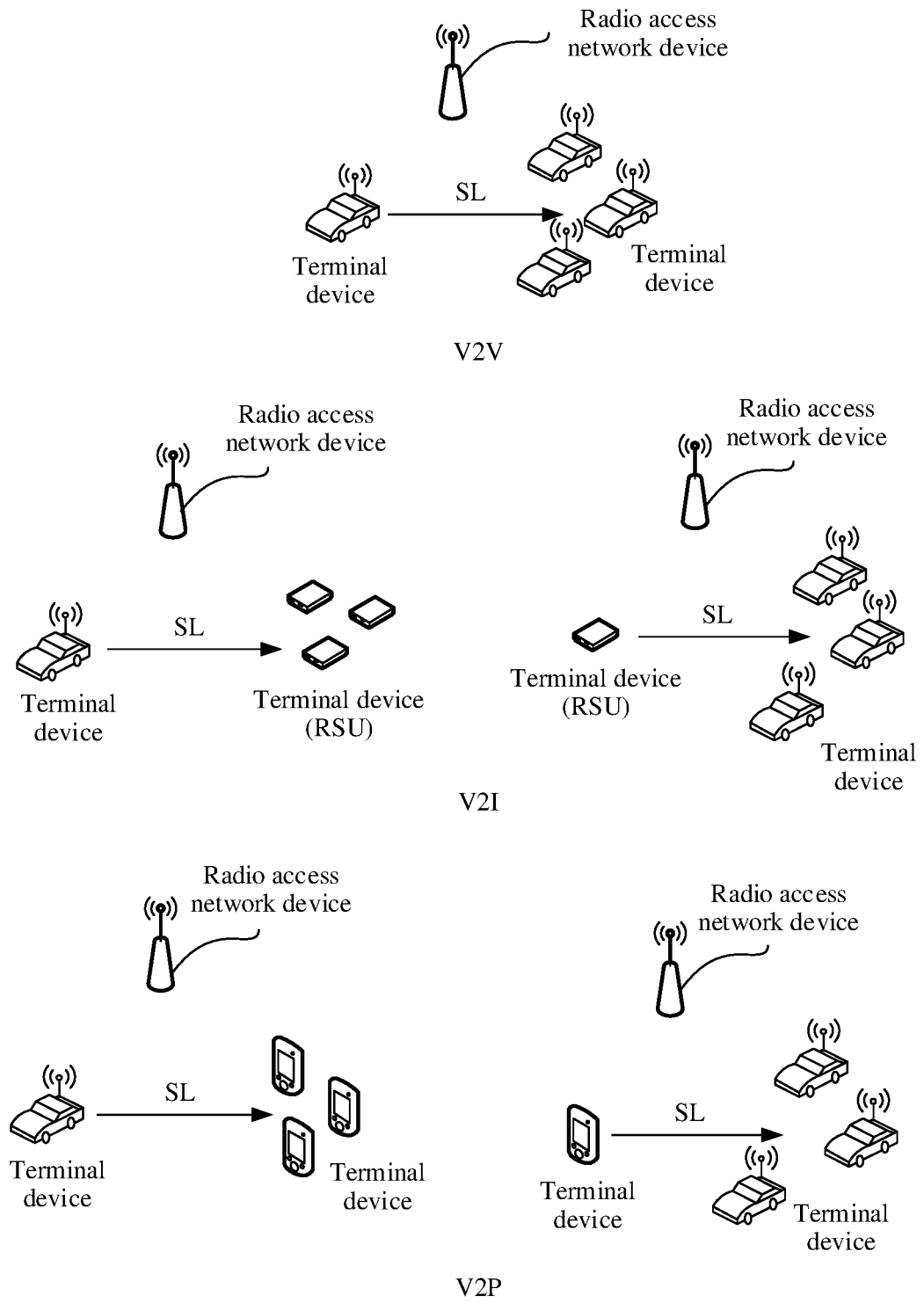
FIG. 1 shows scenarios of a V2X service in which communication is performed through a PC5 interface according to an embodiment of this application.
Figure 2:
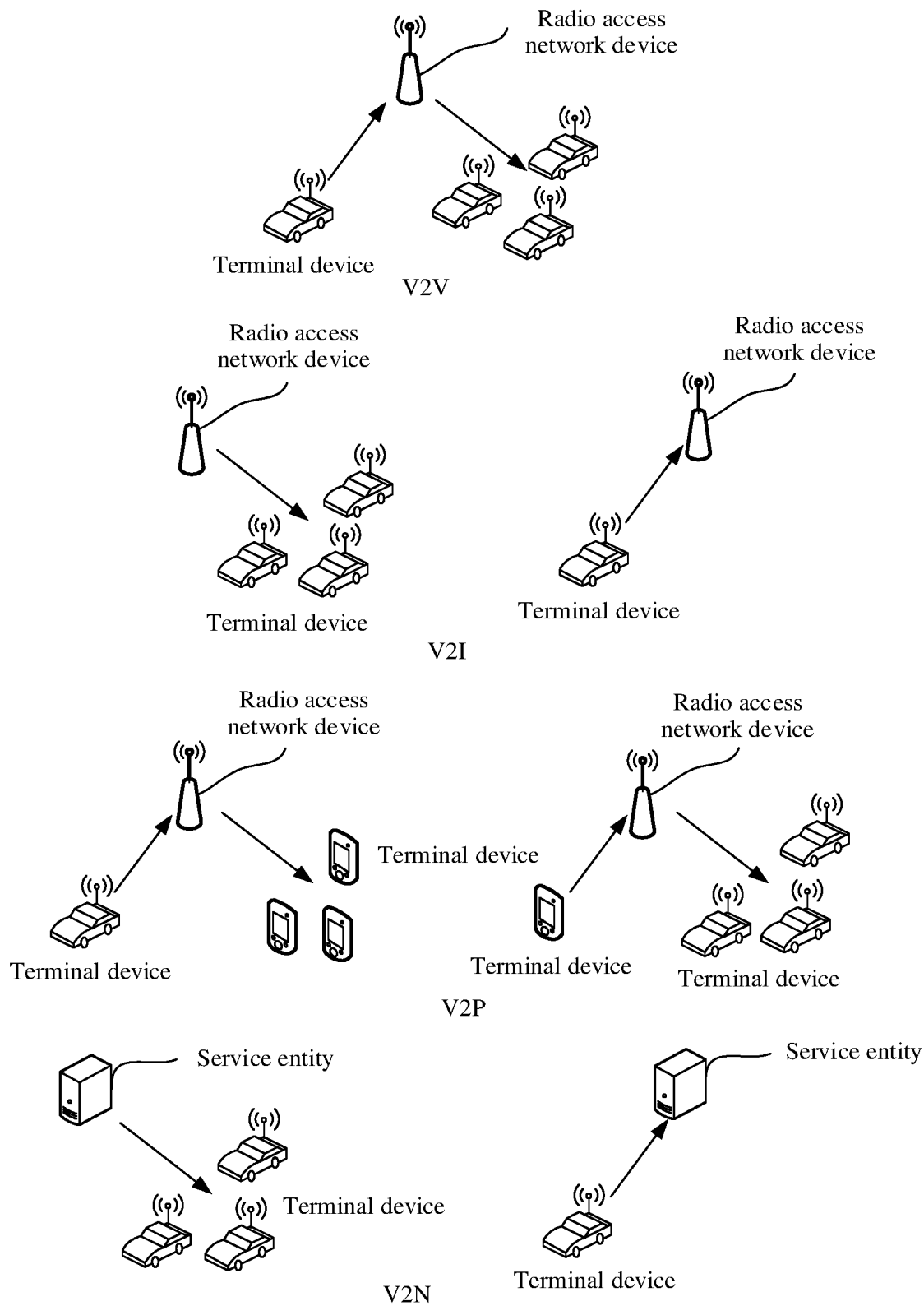
FIG. 2 shows scenarios of a V2X service in which communication is performed through a Uu interface according to an embodiment of this application.

FIG. 1 shows scenarios (including a V2V scenario, a V2I scenario, and a V2P scenario) of the V2X service in which communication is performed through the PC5 interface. This type of communication is referred to as a V2X sidelink (SL) communication mode. In this case, service data transmitted on the SL is the data of the V2X service. In this case, the terminal device may be within coverage of a cell supporting V2X, or may be outside the coverage of the cell supporting V2X. The terminal device can perform V2X sidelink communication through the PC5 interface (an SL interface) after being authorized. A communication mode through the PC5 interface may be further classified into a mode 3 (mode 3) and a mode 4. In the mode of mode 3, each time before transmitting the data of the V2X service, a V2X terminal device needs to request a resource from the radio access network device, and the radio access network device allocates the resource as required. In the mode 4, a V2X terminal device obtains a V2X sidelink resource through competition in a listening mode to send the data of the V2X service, and the radio access network device does not need to perform scheduling. Certainly, LTE V2X is used as an example herein. The communication mode through the PC5 interface is classified into the mode 3 and the mode 4. Similarly, in NR V2X, the communication mode through the PC5 interface is classified into a mode 1 and a mode 2. In the mode of mode 1, each time before transmitting the data of the V2X service, a V2X terminal device needs to request a resource from the radio access network device, and the radio access network device allocates the resource as required. In the mode 2, a V2X terminal device obtains a V2X sidelink resource through competition in a listening mode to send the data of the V2X service, and the radio access network device does not need to perform scheduling. FIG. 2 shows scenarios (including a V2V scenario, a V2I scenario, a V2P scenario, and a V2N scenario) of the V2X service in which communication is performed through the Uu interface. In the prior art, a transmit-end terminal device sends the data of the V2X service to the radio access network device through the Uu interface, and the radio access network device finds a target terminal device (user equipment, UE) through an APP server on a core network side, and further sends the data of the V2X service to the target terminal device through the Uu interface.

LTE V2X is defined in the prior art. After an NR (new radio) system is introduced, it is discussed in a communication standard that V2X is supported in the NR system. In other words, NR V2X is supported. Compared with LTE V2X, NR V2X provides higher reliability, a lower latency, and a higher throughput. Therefore, NR V2X can be used to implement some new use cases, such as self-driving and group communication. In other words, such services can be carried only through NR V2X. However, in some V2X use cases, for example, basic security-related communication, it is expected that all V2X terminal devices can receive the basic security-related communication. Therefore, it is better to use LTE V2X for communication. There is still another type of V2X use case that is not closely related to a RAT. That is, transmission in LTE V2X or NR V2X is feasible. In this case, transmission quality is mainly ensured based on a V2X sidelink.

In a current discussion process of R15 LTE V2X, some physical layer features are introduced in a standard, for example, higher-order modulation and transmit diversity. However, these features are not compatible with a terminal device that complies with R14 LTE V2X. This means that if a V2X terminal device transmits data of a V2X service by using a new R15 physical layer feature, not all V2X terminal devices can receive the data. For example, an R14 LTE V2X terminal device cannot perform parsing. However, for data of some V2X services, for example, basic security-related information, it is expected that all the V2X terminal devices can receive and parse the data. In this way, for these services, the data needs to be sent in a manner that is compatible with all the V2X terminal devices. Currently, two sets of tx profiles (configuration information used to send data) are defined in the standard. A tx profile 1 is as follows. A terminal device shall use a Rel-14 compatible format (use a Rel-14 MCS table, not to use a Rel-15 feature). That is, the terminal device uses the R14 compatible format. In other words, the terminal device uses the R14 MCS (modulation and coding scheme, modulation and coding scheme) table, and does not use the R15 feature. A tx profile 2 is as follows. A terminal device shall use a Rel-15 format that is not compatible with Rel-14 (where rate matching is used, and Rel-15 MCS table is used). That is, the terminal device uses the R15 format that is not compatible with R14. In other words, the R15 MCS table is used for rate matching. However, the tx profile is of a service granularity. In other words, all data corresponding to the service is sent in a manner limited by the tx profile. When a V2X application layer of the terminal device sends the data of the V2X service to an AS layer of the terminal device, the V2X application layer also indicates the tx profile of the service, and the terminal device sends the data of the V2X service in a corresponding format based on the indication. In the prior art, a core network is allowed to determine only a tx profile of a service, but the core network device is not aware of a real-time status of a sidelink. In this way, the tx profile is equivalent to one static configuration. Consequently, transmission quality of the service may not be satisfied.

To resolve the foregoing problem, an embodiment of this application provides a communication method. The method includes a radio access network device obtains configuration information that is used by a terminal device to transmit service data on a sidelink, where the configuration information includes any one or more of the following configuration parameters, including a technology type, an air interface, a radio access technology, and a mode that are used by the terminal device to transmit the service data on the sidelink, where the sidelink is a wireless communication link between the terminal device and another terminal device, and the radio access network device generates indication information based on the configuration information, and the radio access network device sends the indication information to the terminal device, to indicate the terminal device to transmit the service data on the sidelink based on the indication information. In this way, in the prior art, a core network device statically configures a tx profile for the terminal device, and in this application, the radio access network device first obtains the configuration information used by the terminal device to transmit the service data on the sidelink. For example, the configuration information may be configured by the core network device for the terminal device or configured by the radio access network device for the terminal device based on a request of the terminal device. Because the radio access network device can sense a real-time status of the sidelink, the radio access network device may send the indication information to the terminal device based on the configuration information with reference to the real-time status of the sidelink. In this way, the terminal device transmits the service data on the sidelink based on the indication information, to improve transmission quality of the service.

Figure 3:
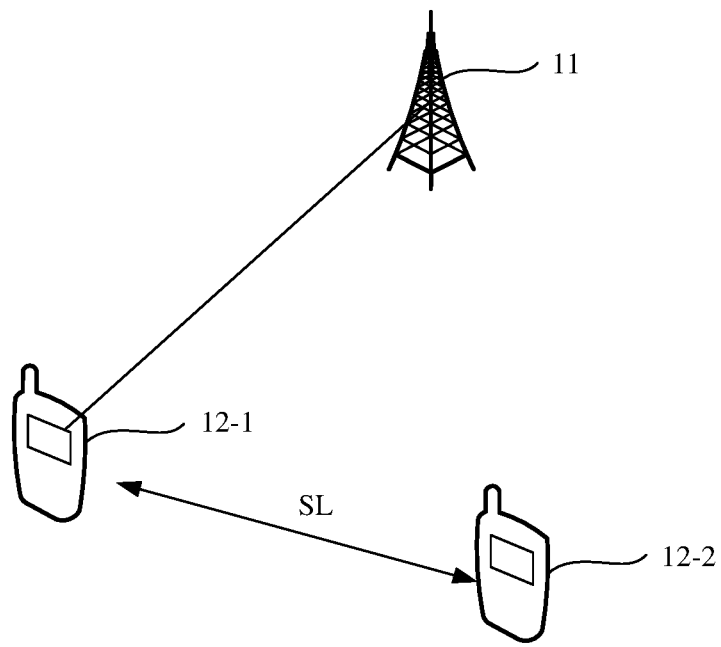
FIG. 3 is a schematic structural diagram of a communications system according to an embodiment of this application.
Figure 4:
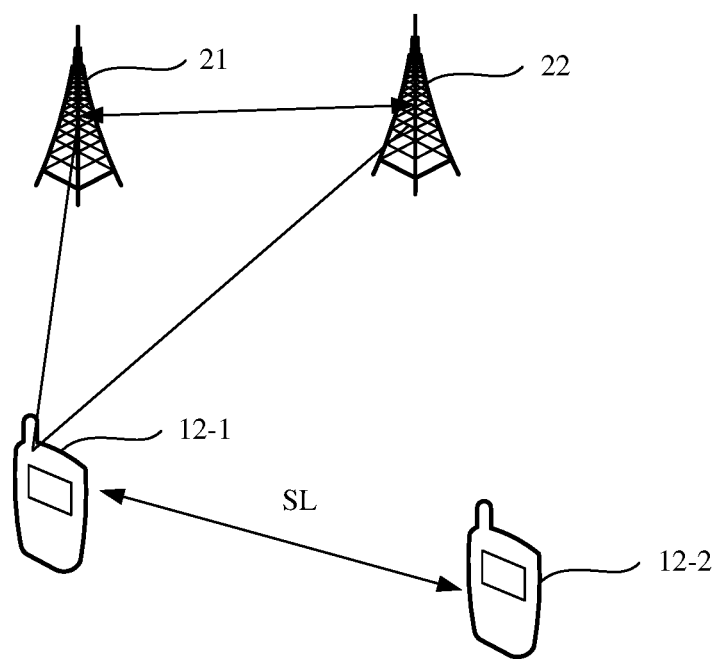
FIG. 4 is a schematic structural diagram of a communications system according to another embodiment of this application.

Specifically, the embodiments of this application provide a communications system. As shown in FIG. 3, the communications system includes a radio access network device and a terminal device, for example, a radio access network device 11 and terminal devices 12 (12-1 and 12-2). In addition, the embodiments of this application further include a core network device. The core network device may be an MME in an LTE system, an AMF in an NR system, or a V2X control node (control function). The V2X control node may belong to the LTE system, or may belong to the NR system, or may belong to both the LTE system and the NR system. Data of a V2X service may be transmitted between the terminal device 12-1 and the terminal device 12-2 by using an SL. The embodiments of this application may be used for a wireless communications system that supports both LTE and NR. The radio access network device 11 may be an LTE radio access network device that supports both LTE and NR V2X, or may be an NR radio access network device that supports both LTE and NR V2X. Alternatively, as shown in FIG. 4, the communications system includes two radio access network devices: a radio access network device 21 supporting LTE V2X and a radio access network device 22 supporting NR V2X. The core network device is configured to configure the configuration information, for example, a tx profile, for the terminal device. The radio access network device is configured to send the indication information to the terminal device based on the configuration information, for example, may be rewriting the tx profile or configuring, in another manner, a path used by the terminal device to transmit the data of the V2X service. The terminal device transmits the data of the V2X service based on the indication information. When the two radio access network devices are used, the radio access network device 21 supporting LTE V2X provides an LTE V2X configuration for the terminal device, to transmit data of an LTE V2X-related service, and the radio access network device 22 supporting NR V2X provides an NR V2X configuration for the terminal device, to transmit data of an NR V2X-related service. In addition, before this, there is information exchange between the radio access network device 21 and the radio access network device 22.

The terminal device in the embodiments of this application may be an in-vehicle terminal (for example, an in-vehicle terminal 500 shown in FIG. 5), a mobile phone, a tablet computer, a personal computer PC, a personal digital assistant PDA, a smartwatch, a netbook, a wearable electronic device, or the like that can exchange information with the radio access network device, and the embodiments of this application do not impose any special limitation on a specific form of the device. The radio access network device shown in FIG. 6 may be configured to communicate with one or more terminal devices, or may be configured to communicate with one or more radio access network devices having a part of terminal device functions (for example, when the radio access network device is a base station, the radio access network device is a macro base station and a micro base station, or when the radio access network device is an access point, communication is performed between access points). Alternatively, the radio access network device may be an access point, a node, a NodeB, an evolved NodeB (eNB), or another network entity, and may include a part or all of functions of the foregoing network entities. When the radio access network device is a base station, in systems using different radio access technologies, names of the base station may be different. For example, in an LTE network (or referred to as a 4G system), a name of the base station is an evolved NodeB (eNB or eNodeB), in a third generation (3G) system, a name of the base station is a NodeB, and in a next generation wireless communications system (for example, a fifth generation (5G) system), a name of the base station is a gNB. With evolution of communications technologies, a name of the base station may change. In addition, in another possible case, the base station may be another apparatus that provides a wireless communication function for a terminal device.

Figure 5:
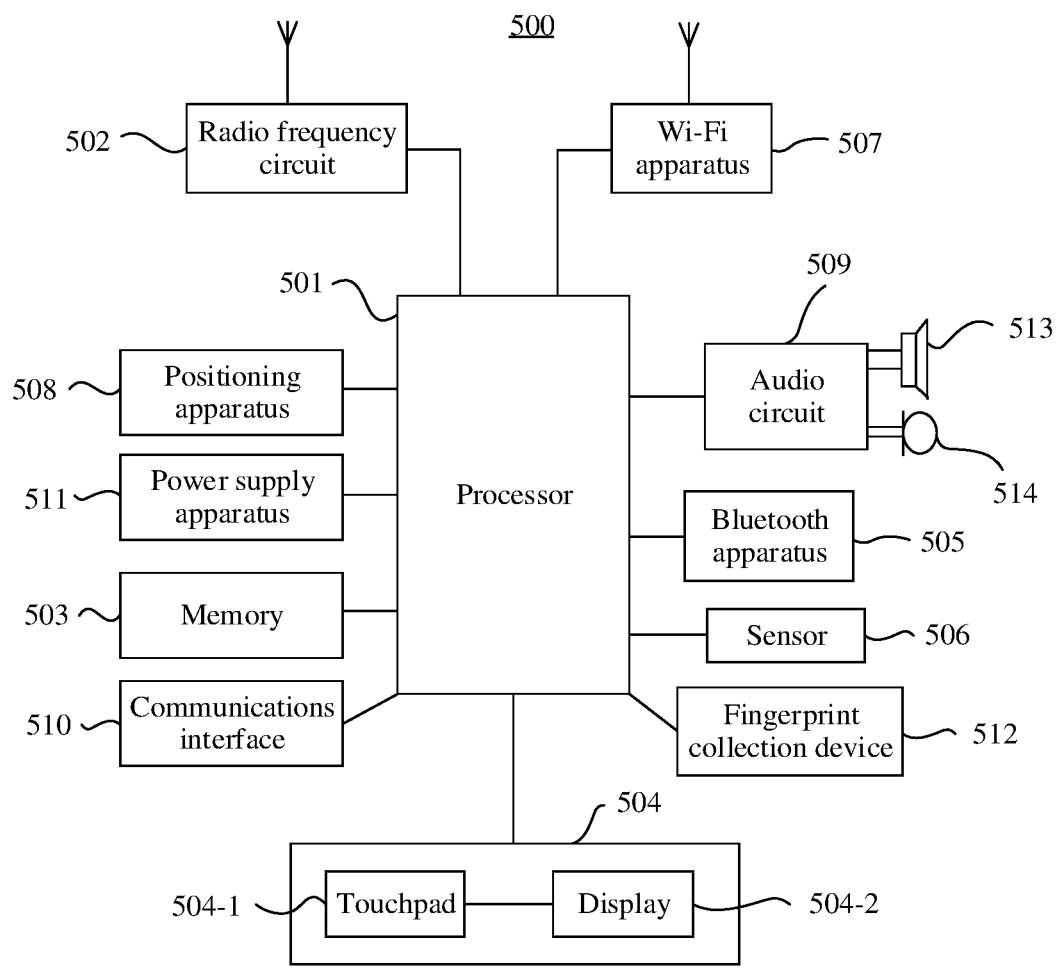
FIG. 5 is a schematic structural diagram of an in-vehicle terminal according to an embodiment of this application.

As shown in FIG. 5, the in-vehicle terminal 500 is used as an example of the foregoing terminal device. The in-vehicle terminal 500 may specifically include a processor 501, or may include one or more components of a radio frequency RF circuit 502, a memory 503, a touchscreen 504, a Bluetooth apparatus 505, one or more sensors 506, a wireless fidelity or Wi-Fi apparatus 507, a positioning apparatus 508, an audio circuit 509, a communications interface 510, and a power supply apparatus 511 as required. These components may communicate through one or more communications buses or signal cables (not shown in FIG. 5). A person skilled in the art may understand that a hardware structure shown in FIG. 5 does not constitute a limitation on the in-vehicle terminal 500, and the in-vehicle terminal 500 may include more or fewer components than those shown in the figure, or combine some components, or have different component arrangements.

The following describes each component of the in-vehicle terminal 500 by using an example with reference to FIG. 5.

The processor 501 is a control center of the in-vehicle terminal 500. The processor 501 is connected to all parts of the in-vehicle terminal 500 through various interfaces and lines, and performs various functions of the in-vehicle terminal 500 and data processing by running or executing an application stored in the memory 503 and invoking data stored in the memory 503. In some embodiments, the processor 501 may include one or more processing units. In some embodiments of this application, the processor 501 may further include a fingerprint verification chip, configured to verify a collected fingerprint.

The radio frequency circuit 502 may be configured to send and receive a radio signal in an information sending/receiving process or a call process. Particularly, after receiving downlink data from the radio access network device, the radio frequency circuit 502 may send the downlink data to the processor 501 for processing, and sends related uplink data to the radio access network device. Usually, the radio frequency circuit includes but is not limited to an antenna, at least one amplifier, a transceiver, a coupler, a low noise amplifier, a duplexer, and the like. In addition, the radio frequency circuit 502 may further communicate with another device through wireless communication. The wireless communication may use any communication standard or protocol, including but not limited to global system for mobile communications, general packet radio service, code division multiple access, wideband code division multiple access, long term evolution, email, short message service, and the like.

The memory 503 is configured to store an application program and data. The processor 501 executes various functions and data processing of the in-vehicle terminal 500 by running the application program and the data that are stored in the memory 503. The memory 503 mainly includes a program storage area and a data storage area. The program storage area may store an operating system, and an application program needed by at least one function (for example, a sound playing function or an image processing function). The data storage area may store data (for example, audio data or a phone book) created based on use of the in-vehicle terminal 500. In addition, the memory 503 may include a high-speed random access memory (RAM), and may further include a nonvolatile memory such as a magnetic disk storage device, a flash memory, or another volatile solid-state storage device. The memory 503 may store various operating systems such as an iOS operating system and an Android operating system. The memory 503 may be stand-alone, and is connected to the processor 501 through the communications bus. The memory 503 may alternatively be integrated with the processor 501.

The touchscreen 504 may specifically include a touchpad 504-1 and a display 504-2.

The touchpad 504-1 may collect a touch event (for example, an operation performed by a user of the in-vehicle terminal 500 on the touchpad 504-1 or near the touchpad 504-1 by using any proper object such as a finger or a stylus) performed by the user on or near the touchpad 504-1, and send collected touch information to another device (for example, the processor 501). The touch event performed by the user near the touchpad 504-1 may be referred to as a floating touch. The floating touch may mean that the user does not need to directly touch the touchpad to select, move, or drag an object (for example, an icon), and the user only needs to be near a device to perform a desired function. In addition, the touchpad 504-1 may be implemented in a plurality of types such as a resistive type, a capacitive type, an infrared type, and a surface acoustic wave type.

The display (also referred to as a display) 504-2 may be configured to display information entered by the user or information provided for the user, and various menus of the in-vehicle terminal 500. The display 504-2 may be configured in a form such as a liquid crystal display or an organic light-emitting diode. The touchpad 504-1 may cover the display 504-2. When detecting the touch event on or near the touchpad 504-1, the touchpad 504-1 transfers the touch event to the processor 501 to determine a type of the touch event. Then, the processor 501 can provide a corresponding visual output on the display 504-2 based on the type of the touch event. In FIG. 5, the touchpad 504-1 and the display 504-2 serve as two independent components to implement input and output functions of the in-vehicle terminal 500. However, in some embodiments, the touchpad 504-1 and the display 504-2 may be integrated to implement the input and output functions of the in-vehicle terminal 500. It may be understood that the touchscreen 504 is formed by stacking a plurality of layers of materials. In the embodiments of this application, only the touchpad (layer) and the display (layer) are displayed, and another layer is not recorded in this embodiment of this application. In addition, when the in-vehicle terminal 500 is a device in another form, for example, a mobile terminal, the touchpad 504-1 may be disposed on a front side of the in-vehicle terminal 500 in a form of a full panel, and the display 504-2 may also be disposed on the front side of the in-vehicle terminal 500 in a form of a full panel. In this way, a frameless structure can be implemented on the front side of the in-vehicle terminal 500.

In addition, the in-vehicle terminal 500 may further have a fingerprint recognition function. For example, a fingerprint sensor is disposed on the front side (for example, below the touchscreen 504) of the in-vehicle terminal 500, or when the in-vehicle terminal 500 is a mobile terminal, the fingerprint sensor may be disposed on a back side (for example, below a rear-facing camera) of the in-vehicle terminal 500. For another example, a fingerprint collection device may be configured in the touchscreen 504 to implement the fingerprint recognition function. In other words, the fingerprint collection device may be integrated with the touchscreen 504 to implement the fingerprint recognition function of the in-vehicle terminal 500. In this case, the fingerprint collection device is disposed on the touchscreen 504, and may be a part of the touchscreen 504, or may be disposed on the touchscreen 504 in another manner. In the embodiments of this application, a main component of the fingerprint collection device 512 is a fingerprint sensor. The fingerprint sensor may use any type of sensing technology, including but not limited to an optical sensing technology, a capacitive sensing technology, a piezoelectric sensing technology, an ultrasonic sensing technology, or the like.

The in-vehicle terminal 500 may further include the Bluetooth apparatus 505, configured to implement data exchange between the in-vehicle terminal 500 and another short-distance device (for example, a mobile phone or a smartwatch). In the embodiments of this application, the Bluetooth apparatus may be an integrated circuit, a Bluetooth chip, or the like.

The in-vehicle terminal 500 may further include at least one sensor 506, for example, an optical sensor or another sensor. For example, the optical sensor may include an ambient optical sensor and a proximity sensor. The ambient optical sensor may adjust luminance of the display of the touchscreen 504 based on intensity of ambient light. The proximity sensor may power on the display when a human body (for example, a finger or an arm) approaches the in-vehicle terminal 500. When the in-vehicle terminal 500 is a mobile terminal, the in-vehicle terminal 500 may further include a motion sensor. As a type of the motion sensor, an accelerometer sensor may detect a value of an acceleration in each direction (usually three axes). The accelerometer sensor may detect a value and a direction of gravity when the accelerometer sensor is in a static state, and may be used for an application for recognizing a posture of the in-vehicle terminal 500 (such as switching between a landscape screen and a vertical screen, a related game, and magnetometer posture calibration), a function related to vibration identification (such as a pedometer or a knock), and the like. When the in-vehicle terminal 500 is used, other sensors such as a gyroscope, a barometer, a hygrometer, a thermometer, and an infrared sensor may also be disposed. Details are not described herein.

The Wi-Fi apparatus 507 is configured to provide, for the in-vehicle terminal 500, network access that complies with a Wi-Fi-related standard protocol. The in-vehicle terminal 500 may access a Wi-Fi access point through the Wi-Fi apparatus 507, to help the user send and receive an email, browse a web page, access streaming media, and the like. The Wi-Fi apparatus 507 provides a wireless broadband internet access for the user. In some other embodiments, the Wi-Fi apparatus 507 may also be used as a Wi-Fi wireless access point, and may provide Wi-Fi network access for another device.

The positioning apparatus 508 is configured to provide a geographical location for the in-vehicle terminal 500. It can be understood that the positioning apparatus 508 may be specifically a receiver of a positioning system such as a global positioning system (GPS), a BeiDou navigation satellite system, or a Russian GLONASS. After receiving a geographic location sent by the positioning system, the positioning apparatus 508 sends the information to the processor 501 for processing, or sends the information to the memory 503 for storage. In some other embodiments, the positioning apparatus 508 may alternatively be a receiver of an assisted global positioning system (AGPS). The AGPS system serves as an assisted server to assist the positioning apparatus 508 in completing ranging and positioning services. In this case, the assisted positioning server communicates with a device such as the positioning apparatus 508 (namely, a GPS receiver) of the in-vehicle terminal 500 through a wireless communications network, to provide positioning assistance. In some other embodiments, the positioning apparatus 508 may alternatively be a positioning technology based on a Wi-Fi access point. Each Wi-Fi access point has a globally unique media access control (MAC) address, and the device may scan and collect a broadcast signal of a Wi-Fi access point nearby when Wi-Fi is enabled. Therefore, the device may obtain a MAC address broadcast through the Wi-Fi access point. The device sends such data (for example, the MAC address) that can identify the Wi-Fi access point to a location server through the wireless communications network. The location server retrieves a geographical location of each Wi-Fi access point, calculates a geographical location of the device with reference to strength of the Wi-Fi broadcast signal, and sends the geographical location of the device to the positioning apparatus 508 of the device.

The audio circuit 509, a speaker 513, and a microphone 514 may provide an audio interface between the user and the in-vehicle terminal 500. The audio circuit 509 may convert received audio data into an electrical signal and then transmit the electrical signal to the speaker 513, and the speaker 513 converts the electrical signal into a sound signal for output. In addition, the microphone 514 converts a collected sound signal into an electrical signal. The audio circuit 509 receives the electrical signal, converts the electrical signal into audio data, and then outputs the audio data to the RF circuit 502, to send the audio data to, for example, the in-vehicle terminal 500, or outputs the audio data to the memory 503 for further processing.

The communications interface 510 is configured to provide various interfaces for an external input/output device (for example, a keyboard, a mouse, an external display, an external memory, or a subscriber identification module card). For example, the communications interface 510 is connected to the mouse through a universal serial bus (USB) interface, and the communications interface 510 is connected, by using a metal contact on a card slot of the subscriber identification module card, to the subscriber identification module (SIM) card provided by a telecommunications operator. The communications interface 510 may be configured to couple the external input/output peripheral device to the processor 501 and the memory 503.

In the embodiments of this application, the in-vehicle terminal 500 may communicate with another device in a device group through the communications interface 510, for example, may receive, through the communications interface 510, display data sent by the another device, and display the display data. This is not limited in the embodiments of this application.

The in-vehicle terminal 500 may further include the power apparatus 511 (for example, a battery or a power management chip) that supplies power to the components. The battery may be logically connected to the processor 501 via the power management chip, so that the power apparatus 511 implements functions such as charging and discharging management and power consumption management.

Although not shown in FIG. 5, the in-vehicle terminal 500 may further include a camera (a front-facing camera and/or a rear-facing camera), a flash, a micro projection apparatus, a near field communications (NFC) apparatus, and the like. Details are not described herein.

Figure 6:
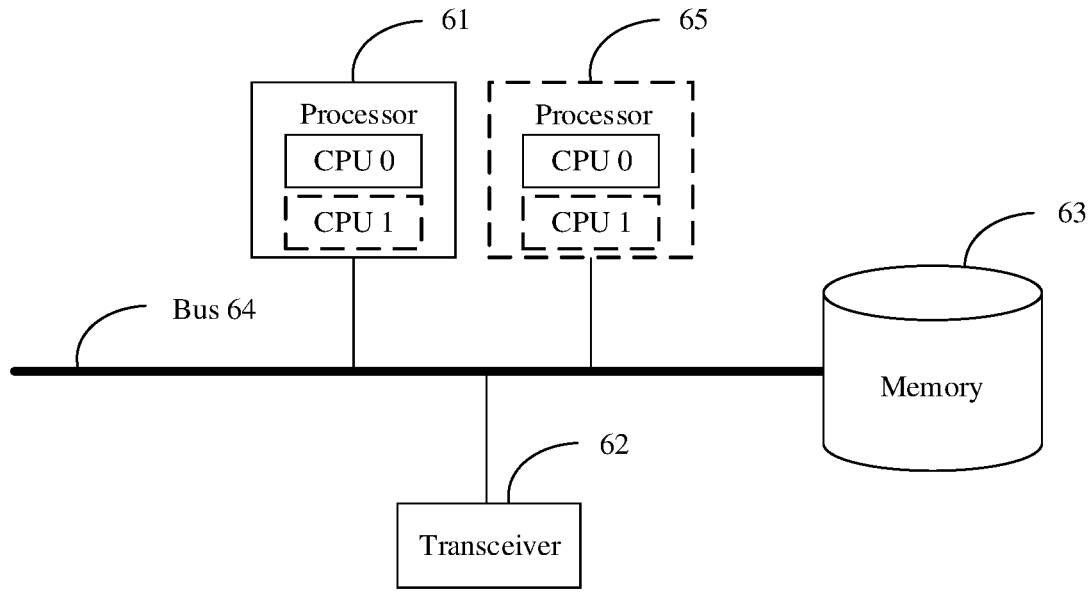
FIG. 6 is a schematic structural diagram of a radio access network device according to an embodiment of this application.

FIG. 6 is a schematic composition diagram of a radio access network device according to an embodiment of this application. As shown in FIG. 6, the radio access network device may include at least one processor 61 and a transceiver 62.

The following specifically describes an example of each constituent component of the radio access network device with reference to FIG. 6.

The processor 61 is a control center of the radio access network device, and may be one processor, or may be a collective term for a plurality of processing elements. For example, the processor 61 is a central processing unit (CPU), may be an application-specific integrated circuit (ASIC), or may be one or more integrated circuits configured to implement the embodiments of this application, for example, one or more microprocessors, digital signal processors (DSPs) or one or more field programmable gate arrays (FPGAs). Certainly, the radio access network device may further include a memory 63.

The processor 61 may independently perform functions of the radio access network device in this application, or may perform various functions of the radio access network device by running or executing a software program stored in the memory 63 and invoking data stored in the memory 63.

In an embodiment, the processor 61 may include one or more CPUs, for example, a CPU 0 and a CPU 1 shown in the figure.

During specific implementation, in an embodiment, the radio access network device may include a plurality of processors, for example, the processor 61 and a processor 65 that are shown in FIG. 6. Each of the processors may be a single-core processor (single-CPU) or may be a multi-core processor (multi-CPU). The processor herein may be one or more devices, circuits, and/or processing cores configured to process data (for example, a computer program instruction).

The memory 63 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 63 is not limited thereto. The memory 63 may exist independently, and is connected to the processor 61 through the bus 64. The memory 63 may alternatively be integrated with the processor 61.

The memory 63 is configured to store a software program for executing the solutions of this application, and the processor 61 controls the execution.

The transceiver 62 is configured to communicate with another device or a communications network, for example, configured to communicate with a communications network such as an ethernet, a radio access network (RAN), or a wireless local area network (WLAN). The transceiver 62 may include all or a part of a baseband processor, and may further optionally include a radio frequency (RF) processor. The RF processor is configured to send and receive an RF signal. The baseband processor is configured to process a baseband signal converted from the RF signal or a baseband signal to be converted into the RF signal.

The bus 64 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 6, but this does not mean that there is only one bus or only one type of bus.

The structure of the device shown in FIG. 6 does not constitute a limitation on the radio access network device. The device may include more or fewer components than those shown in the figure, or some components may be combined, or the device may have different component arrangements.

Figure 7:
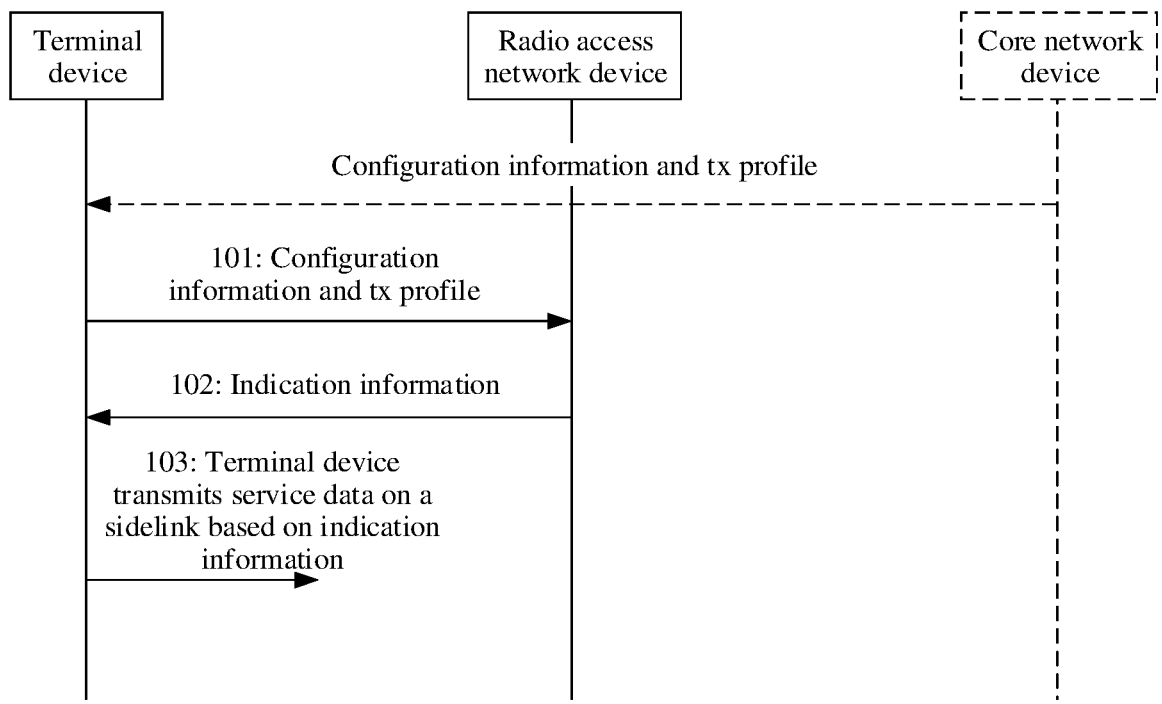
FIG. 7 is a schematic flowchart of a communication method according to an embodiment of this application.

Based on the foregoing network system and hardware, an embodiment of this application provides a communication method. Referring to FIG. 7, the communication method includes the following steps.

101: A radio access network device obtains configuration information.

The configuration information is used by a terminal device to transmit service data on a sidelink, and the configuration information includes any one or more of the following configuration parameters, including a technology type, an air interface, a radio access technology, and a mode that are used by the terminal device to transmit the service data on the sidelink, where the sidelink is a wireless communication link between the terminal device and another terminal device.

In an example solution, the configuration information may be sent by a core network device to the terminal device. The configuration information is at a granularity of a V2X service. In other words, each V2X service corresponds to one piece of configuration information. For example, the core network device prestores a correspondence between the V2X service and the configuration information (a tx profile), or the core network device dynamically determines the configuration information based on information about the terminal device and/or information about the V2X service.

Usually, the terminal device may select a corresponding technology type based on a tx profile configured by the core network device for the terminal device, to transmit data of the V2X service. For example, the tx profile may indicate the technology type used by the terminal device to transmit the service data on the sidelink. For example, the technology type may include LTE V2X and NR V2X. Optionally, the technology type may include specific version information of a V2X technology, for example, R14 LTE V2X, R15 LTE V2X, R16 NR V2X, and a possible subsequent evolved version, for example, R16 LTE V2X and R17 NR V2X. Optionally, if the configuration information indicates only the technology type but does not limit the mode used by the terminal device to transmit the service data on the sidelink, after receiving the configuration information, the terminal device and the radio access network device may transmit the data of the V2X service in either of two modes, that is, both a mode 1 and a mode 2 may be used. In addition, the configuration information may include the air interface used by the terminal device to transmit the service data on the sidelink. For example, the tx profile may indicate LTE Uu and/or NR Uu. In an actual scenario, the V2X service can be transmitted only through the air interface (Uu). In consideration of a difference between LTE Uu and NR Uu, technology types supported by LTE Uu and NR Uu may be different. Therefore, the mode may be further distinguished, for example, the mode 1 and/or the mode 2 (a mode 3 and/or a mode 4 in LTE V2X). Therefore, the configuration information may include the mode used by the terminal device to transmit the service data on the sidelink. Resource management manners of the two modes are different. Consequently, the two modes satisfy quality of service (quality of service, QoS) differently. Simply, under a same condition, it is generally considered that the mode 1 has higher reliability, and the mode 2 has a shorter delay. Similarly, if the configuration information indicates only the mode but does not limit the technology type, the terminal device and the radio access network device may consider that the core network device limits only the mode but does not limit the technology type. In this case, any technology type may be selected to transmit the data of the V2X service in the limited mode. The configuration information may include a RAT (radio access technology, radio access technology) used by the terminal device to transmit the service data on the sidelink. For example, the tx profile includes LTE and/or NR. Similarly, if the configuration information indicates only the RAT but does not indicate the others, the terminal device and the radio access network device may consider that both the air interface and an SL interface may be used provided that the RAT is met. Based on the foregoing understanding, it is considered that the core network device is allowed to perform stronger control. Therefore, the configuration information may include a combination of the foregoing configuration parameters. For example, a mode used when a used technology type is R16 NR V2X is the mode 1, and a mode used when a used technology type is R15 LTE V2X is the mode 4. Certainly, there may be more combinations based on the foregoing configuration parameters, and details are not described herein.

For step 101, a specific manner in which the radio access network device obtains the configuration information may be as follows. The radio access network device receives the configuration information that is configured for the terminal device and that is sent by the core network device, or the radio access network device receives the configuration information sent by the terminal device, where the configuration information is sent by the core network device to the terminal device. In other words, the core network device may send the tx profile to the radio access network device when configuring the tx profile for the terminal device, or after the core network device configures the tx profile for the terminal device, the terminal device forwards the tx profile to the radio access network device. FIG. 7 shows only a process in which the terminal device sends the configuration information to the radio access network device.

102: The radio access network device generates indication information based on the configuration information, and sends the generated indication information to the terminal device.

In step 101, because the radio access network device obtains the configuration information, when configuring the indication information for the terminal device, the radio access network device needs to consider the tx profile configured by the core network device for the terminal device. In this case, the radio access network device generates the indication information based on the configuration information. For example, the indication information may be a rewritten tx profile, for example, a configuration parameter reselected by the radio access network device within a limitation range of the tx profile configured by the core network device. Alternatively, the indication information directly carries a resource configuration used by the terminal device to transmit the data of the V2X service, and the resource configuration is directly generated by the radio access network device based on one or more configuration parameters in the tx profile configured by the core network device. In addition, the indication information may alternatively be a tx profile that is directly rewritten by the radio access network device without considering the tx profile configured by the core network device for the terminal device.

According to a candidate parameter included in the configuration parameter included in the configuration information, in step 102, the radio access network device may specifically generate the indication information in the following different manners.

Manner 1: When any configuration parameter included in the configuration information includes one candidate parameter, the radio access network device may directly configure a resource for the terminal device based on the candidate parameter, and send the indication information carrying a resource configuration corresponding to the candidate parameter to the terminal device. For example, if the tx profile of the V2X service is LTE V2X, resource configuration of an LTE V2X sidelink is generated for the V2X service of the terminal device. For example, the resource configuration of the LTE V2X sidelink may include a sending resource pool and/or a receiving resource pool of the LTE V2X sidelink. If the tx profile of the V2X service is NR V2X, resource configuration of an NR V2X sidelink is generated for the V2X service of the terminal device. For example, the resource configuration of the NR V2X sidelink may include a sending resource pool and a receiving resource pool of the NR V2X sidelink. Finally, in step 103, the terminal device performs V2X service communication based on the resource configuration indicated by the indication information.

Manner 2: When any configuration parameter included in the configuration information includes at least two candidate parameters, details are described in the following examples.

Example 1: Any configuration parameter included in the configuration information includes the at least two candidate parameters. For example, the tx profile of the V2X service is LTE V2X or NR V2X. In this case, the radio access network device may determine a target candidate parameter in the at least two candidate parameters. For example, the radio access network device determines, for the terminal device, whether to use LTE V2X or NR V2X to transmit the data of the V2X service. In addition, the radio access network device sends the indication information carrying a resource configuration corresponding to the target candidate parameter to the terminal device. For example, when determining that the terminal device uses LTE V2X to transmit the data of the V2X service, the radio access network device generates a resource configuration of LTE V2X for the V2X service of the terminal device. Finally, the terminal device transmits the data of the V2X service based on the resource configuration indicated by the indication information.

Example 2: Any configuration parameter included in the configuration information includes the at least two candidate parameters. For example, the mode of NR V2X is the mode 1 or the mode 2. In this case, the radio access network device may determine a target candidate parameter in the at least two candidate parameters. For example, when the radio access network device determines that the terminal device uses an NR V2X mode 2 to transmit the data of the V2X service, and the radio access network device sends the indication information carrying the NR V2X mode 2 to the terminal device, finally, the terminal device transmits the data of the V2X service based on the NR V2X mode 2 indicated by the indication information.

Example 3: The radio access network device defines a set of rules for the terminal device, so that the terminal device performs selection according to the rules. For example, if the indication information is used to indicate a candidate parameter selection rule, in step 103, the terminal device may select the target candidate parameter from the at least two candidate parameters according to the candidate parameter selection rule, and finally use the target candidate parameter to transmit the data of the V2X service. For example, the candidate parameter selection rule may be that when a CBR (channel busy ratio), of an LTE V2X sidelink, obtained by the terminal device through measurement is greater than or equal to a threshold, and/or a CBR, of an NR V2X sidelink, obtained by the terminal device through measurement is less than or equal to a threshold, NR V2X is selected for transmission. When the CBR of the LTE V2X sidelink is less than or equal to the threshold, and/or the CBR of the NR V2X sidelink is greater than or equal to the threshold, LTE V2X is selected for transmission. Finally, the terminal device requests, from the radio access network device based on the determined candidate parameter, a resource for transmitting the data of the V2X service. For example, after selecting the to-be-used candidate parameter, the terminal device requests the resource configuration from the radio access network device, and transmits the data of the V2X service by using the resource configuration sent by the radio access network device. For example, that the terminal device selects a used technology type may be implemented in the following manner, where the terminal device directly selects the to-be-used technology type, or the terminal device selects the to-be-used technology type based on a measurement result of the V2X sidelink. Measurement may be measuring a CBR (channel busy ratio) of the V2X sidelink. For example, the terminal device selects a V2X sidelink with a better CBR measurement result for transmission, or the terminal device selects a currently available V2X sidelink for transmission. For example, if only an NR V2X resource is currently available, NR V2X is used for transmission. The V2X service may be represented by using a destination ID (destination identifier), or may be represented by using a provider service identifier (PSID) or an intelligent transportation system application identifier (ITS-AID). The tx profile may be represented by using a tx profile ID. In this case, a set of tx profiles needs to be defined in a protocol, and all network elements can know a meaning corresponding to each tx profile ID. Alternatively, the tx profile may be indicated in an explicit manner.

For the foregoing scenario in which the terminal device selects the candidate parameter based on the measurement, in this case, the radio access network device may broadcast or send, by using radio resource control (RRC) signaling, a set of thresholds to the terminal device. CBR measurement is used as an example. The thresholds may be LTE V2X SL CBR thresholds, or NR V2X SL CBR thresholds, or LTE V2X SL CBR thresholds and NR V2X SL CBR thresholds. That the radio access network device configures the LTE V2X SL CBR threshold for the terminal device is used as an example. If a result, of an LTE V2X SL CBR, obtained by the terminal device through measurement is less than or equal to the LTE V2X SL CBR threshold, the terminal device selects the LTE V2X SL to transmit the data of the V2X service. That the radio access network device configures the NR V2X SL CBR threshold for the terminal device is used as an example. If a result, of an NR V2X SL CBR, obtained by the terminal device through measurement is less than or equal to the NR V2X SL CBR threshold, the terminal device selects the NR V2X SL to transmit the data of the V2X service. That the radio access network device configures the LTE V2X SL CBR threshold and the NR V2X SL CBR threshold for the terminal device is used as an example. If the result, of the LTE V2X SL CBR, obtained by the terminal device through measurement is less than or equal to the LTE V2X SL CBR threshold, and the result of the NR V2X SL CBR is greater than or equal to the NR V2X SL CBR threshold, the LTE V2X SL is selected to transmit the data of the V2X service. If the result, of the LTE V2X SL CBR, obtained by the terminal device through measurement is greater than or equal to the LTE V2X SL CBR threshold, and the result of the NR V2X SL CBR is less than or equal to the NR V2X SL CBR threshold, the NR V2X SL is selected to transmit the data of the V2X service.

It should be noted that the threshold in Example 3 is described by using only the CBR measurement result as an example. It may be understood that the threshold in the solution listed in Example 3 may alternatively be another measurement result, namely, a measurement result obtained through measurement based on a reference signal on a V2X sidelink.

Example 4: Any configuration parameter included in the configuration information includes the at least two candidate parameters. For example, the tx profile of the V2X service is LTE V2X or NR V2X. The radio access network device may further indicate, by using the indication information, the terminal device to transmit a part of the data of one V2X service by using LTE V2X, and transmit the other part of the data by using NR V2X. For example, the radio access network device determines a candidate parameter used for data with different QoS requirements of one V2X service. The radio access network device sends the indication information carrying a resource configuration corresponding to the candidate parameter used for the data with the different QoS requirements of one V2X service to the terminal device. In other words, the radio access network device sends a correspondence between a QoS parameter of one V2X service and the candidate parameter to the terminal device as the indication information. Finally, the terminal device transmits the data of the V2X service based on the resource configuration indicated by the indication information. In this way, the data with the different QOS requirements of one V2X service may be configured to different V2X paths for transmission. QoS may be a PPPP (ProSe per-packet priority), ProSe per-packet reliability (PPPR), a QoS flow identity (QOS flow identity, QFI), a 5G QOS identifier (5QI), or any one or a combination thereof. In this case, the radio access network device configures the correspondence between the QoS parameter and the V2X path for the V2X service. In other words, a part of QoS data of the V2X service is transmitted by using LTE V2X, and a part of QoS data is transmitted by using NR V2X.

In addition, the configuration parameter included in the configuration information is specifically described as follows.

When the tx profile configured by the core network device limits the technology type used by the terminal device to transmit the service data on the sidelink, a specific form of the tx profile may include the following several types:

LTE V2X;

NR V2X; and

LTE V2X and/or NR V2X.

When the terminal device needs to transmit data of one V2X service, if the tx profile indicates the terminal device to transmit the data of the V2X service by using LTE V2X, the radio access network device generates the indication information based on the tx profile and sends the indication information to the terminal device. The indication information includes a resource configuration of LTE V2X, and the terminal device may transmit the service data by using LTE V2X based on the indication information generated by the radio access network device. If the tx profile indicates the terminal device to transmit the data of the V2X service by using NR V2X, the radio access network device generates the indication information based on the tx profile and sends the indication information to the terminal device. The indication information includes a resource configuration of NR V2X, and the terminal device may transmit the service data by using NR V2X based on the indication information generated by the radio access network device. If the tx profile indicates the terminal device to transmit the data of the V2X service by using LTE V2X and/or NR V2X, that is, LTE V2X or NR V2X can be used, the radio access network device generates the indication information based on the tx profile and sends the indication information to the terminal device. Refer to Manner 1 and Manner 2, the indication information may include a resource configuration corresponding to LTE V2X and/or resource configuration corresponding to NR V2X, and the terminal device directly transmits the service data based on the resource configuration sent by the radio access network device. Alternatively, the indication information may include an indication candidate parameter selection rule. Correspondingly, the terminal device autonomously selects LTE V2X and/or NR V2X according to the candidate parameter selection rule, to transmit the service data. Certainly, for a specific implementation in which the terminal device transmits the service data based on the indication information, descriptions of Manner 1 or Manner 2 may be directly referenced, and details are not described herein again. Certainly, the tx profile may be defined in the configuration information to indicate all V2X technology types, or all V2X technology types may be implicitly indicated by not sending the tx profile in the configuration information.

When the tx profile configured by the core network device limits the air interface used by the terminal device to transmit the service data on the sidelink, a specific form of the tx profile may include the following several types:

LTE Uu;

NR Uu; and

LTE Uu and/or NR Uu.

When the tx profile limits the air interface, and the terminal device needs to transmit data of a V2X service, if the tx profile indicates the terminal device to transmit the data of the V2X service through LTE Uu, the radio access network device generates the indication information based on the tx profile. The indication information includes a resource configuration of LTE Uu, and the terminal device may transmit the service data through LTE Uu based on the indication information generated by the radio access network device. If the tx profile indicates the terminal device to transmit the data of the V2X service through NR Uu, the radio access network device generates the indication information based on the tx profile and sends the indication information to the terminal device. The indication information includes a resource configuration of NR Uu, and the terminal device may transmit the service data through NR Uu based on the indication information generated by the radio access network device. If the tx profile indicates the LTE Uu and/or the NR Uu to transmit the V2X service data, that is, LTE Uu and/or NR Uu can be used, the radio access network device generates the indication information based on the tx profile and sends the indication information to the terminal device. Refer to Manner 1 and Manner 2, the indication information may include a resource configuration corresponding to LTE Uu and/or NR Uu, and the terminal device directly transmits the service data based on the resource configuration sent by the radio access network device. Alternatively, the indication information may include an indication candidate parameter selection rule. Correspondingly, the terminal device autonomously selects LTE Uu and/or NR Uu according to the candidate parameter selection rule, to transmit the service data. For example, because LTE Uu and NR Uu may support different V2X service types, the terminal device may autonomously select to use LTE Uu or NR Uu based on the V2X service type. Alternatively, the terminal device may select LTE Uu or NR Uu based on a Uu measurement result. Correspondingly, the radio access network device needs to configure an LTE Uu measurement threshold and/or an NR Uu measurement threshold for the terminal device, and the measurement result may be a reference signal received power (Reference Signal Received Power, RSRP) or reference signal received quality (Reference Signal Received Quality, RSRQ). For example, the radio access network device configures an RSRP threshold of LTE Uu for the terminal device. When the RSRP, of LTE Uu, obtained by the terminal device through measurement is greater than or equal to the RSRP threshold of LTE Uu, LTE Uu is selected for data transmission. Otherwise, NR Uu is selected for data transmission. For example, the radio access network device configures an RSRP threshold of NR Uu for the terminal device. When the RSRP, of NR Uu, obtained by the terminal device through measurement is greater than or equal to the RSRP threshold of NR Uu, NR Uu is selected for data transmission. Otherwise, LTE Uu is selected for data transmission. The radio access network device configures the RSRP threshold of LTE Uu and the RSRP threshold of NR Uu for the terminal device. When the RSRP, of LTE Uu, obtained by the terminal device through measurement is less than or equal to the RSRP threshold of LTE Uu, and the RSRP, of NR Uu, obtained by the terminal device through measurement is greater than or equal to the RSRP threshold, NR Uu is selected for data transmission. The radio access network device configures the RSRP threshold of LTE Uu and the RSRP threshold of NR Uu for the terminal device. When the RSRP, of LTE Uu, obtained by the terminal device through measurement is greater than or equal to the RSRP threshold of LTE Uu, and the RSRP, of NR Uu, obtained by the terminal device through measurement is less than or equal to the RSRP threshold, LTE Uu is selected for data transmission. Certainly, for a specific implementation in which the terminal device and the radio access network device select a corresponding air interface, refer to Manner 1 and Manner 2. Details are not described herein again.

When the tx profile configured by the core network device limits the mode used by the terminal device to transmit the service data on the sidelink, a specific form of the tx profile may include the following several types:

LTE V2X mode 3;
LTE V2X mode 4;
NR V2X mode 1;
NR V2X mode 2;
LTE V2X mode 3 and/or NR V2X mode 1; and
LTE V2X mode 4 and/or NR V2X mode 2.

Similarly, when the tx profile limits the mode used by the terminal device to transmit the service data on the sidelink, and the terminal device needs to transmit data of one V2X service, if the tx profile indicates the terminal device to transmit the data of the V2X service by using the LTE V2X mode 3, the radio access network device generates the indication information based on the tx profile and sends the indication information to the terminal device. The indication information includes a resource configuration of the LTE V2X mode 3, and the terminal device may transmit the service data by using the LTE V2X mode 3 based on the indication information generated by the radio access network device. If the tx profile indicates the terminal device to transmit the data of the V2X service by using the LTE V2X mode 4, the radio access network device generates the indication information based on the tx profile and sends the indication information to the terminal device. The indication information includes a resource configuration of the LTE V2X mode 4, and the terminal device may transmit the service data by using the LTE V2X mode 4 based on the indication information generated by the radio access network device. If the tx profile indicates the terminal device to transmit the data of the V2X service by using the NR V2X mode 1, the radio access network device generates the indication information based on the tx profile and sends the indication information to the terminal device. The indication information includes a resource configuration of the NR V2X mode 1, and the terminal device may transmit the service data by using the NR V2X mode 1 based on the indication information generated by the radio access network device. If the tx profile indicates the terminal device to transmit the data of the V2X service by using the NR V2X mode 2, the radio access network device generates the indication information based on the tx profile and sends the indication information to the terminal device. The indication information includes a resource configuration of the NR V2X mode 2, and the terminal device may transmit the service data by using the NR V2X mode 2 based on the indication information generated by the radio access network device. If the tx profile indicates the terminal device to transmit the data of the V2X service by using the LTE V2X mode 3 and/or the NR V2X mode 1, that is, the LTE V2X mode 3 and/or the NR V2X mode 1 both can be used, the radio access network device generates the indication information based on the tx profile. Refer to Manner 1 and Manner 2, the indication information may include a resource configuration corresponding to the LTE V2X mode 3 and/or the NR V2X mode 1, and the terminal device directly transmits the service data based on the resource configuration sent by the radio access network device. Alternatively, the indication information may include an indication candidate parameter selection rule. Correspondingly, the terminal device autonomously selects the LTE V2X mode 3 and/or the NR V2X mode 1 according to the candidate parameter selection rule, to transmit the service data. Certainly, the tx profile may alternatively indicate the LTE V2X mode 3, the NR V2X mode 1, the LTE V2X mode 4, and the NR V2X mode 2 at the same time. Certainly, for a specific implementation in which the terminal device and the radio access network device select a corresponding V2X mode, refer to Manner 1 and Manner 2. Details are not described herein again.

In this case, the tx profile configured by the core network device limits only a RAT (radio access technology, radio access technology) used by the terminal device to transmit the service data on the sidelink. For example, the tx profile includes:

LTE;
NR; and
LTE and/or NR.

When the tx profile limits the RAT, and the terminal device needs to transmit data of one V2X service, if the tx profile indicates the terminal device to transmit the data of the V2X service by using LTE, the radio access network device generates the indication information based on the tx profile and sends the indication information to the terminal device. The indication information includes a resource configuration of LTE, and the terminal device transmits the service data by using LTE based on the indication information generated by the radio access network device. If the tx profile indicates the terminal device to transmit the data of the V2X service by using NR, the radio access network device generates the indication information based on the tx profile and sends the indication information to the terminal device. The indication information includes a resource configuration of NR, and the terminal device transmits the service data by using NR based on the indication information generated by the radio access network device. If the tx profile indicates that the terminal device can use both LTE and/or NR, the radio access network device generates the indication information based on the tx profile. Refer to Manner 1 and Manner 2, the indication information may include a resource configuration corresponding to LTE and/or NR, and the terminal device directly transmits the service data based on the resource configuration sent by the radio access network device. Alternatively, the indication information may include an indication candidate parameter selection rule. Correspondingly, the terminal device autonomously selects LTE and/or NR according to the candidate parameter selection rule, to transmit the service data. In this case, the terminal device may autonomously select LTE or NR to transmit the service data. Certainly, for a specific implementation in which the terminal device selects a corresponding RAT, refer to the foregoing Manner 1 or Manner 2. Details are not described herein again. Whether V2X sidelink transmission or Uu transmission is used in the RAT is determined by the radio access network device. Optionally, whether the mode 1 or the mode 2 is used is also determined by the radio access network device.

It may be understood that the tx profile may alternatively be one or a combination of the technology type, the air interface, the radio access technology, and the mode that are used by the terminal device to transmit the service data on the sidelink. For example, a combination 1 is that a mode used when a used technology type is R16 NR V2X is the mode 1, a combination 2 is that a mode used when the technology type is R15 LTE V2X is the mode 4, and so on.

103: The terminal device receives the indication information sent by the radio access network device, and transmits the service data on the sidelink based on the indication information.

For example, the indication information may include the resource configuration used by the terminal device to transmit the service data on the sidelink. In this case, step 103 is specifically the terminal device transmits the service data on the sidelink based on the resource configuration.

For example, when any configuration parameter included in the configuration information includes one candidate parameter, the radio access network device may directly configure a resource for the terminal device based on the candidate parameter. In this way, the radio access network device may send the indication information carrying a resource configuration corresponding to the candidate parameter to the terminal device. For example, if the tx profile of the V2X service is LTE V2X, resource configuration of an LTE V2X sidelink is generated for the V2X service of the terminal device. For example, the resource configuration of the LTE V2X sidelink may include a sending resource pool and a receiving resource pool of the LTE V2X sidelink. If the tx profile of the V2X service is NR V2X, resource configuration of an NR V2X sidelink is generated for the V2X service of the terminal device. For example, the resource configuration of the NR V2X sidelink may include a sending resource pool and a receiving resource pool of the NR V2X sidelink. Finally, the terminal device performs V2X service communication based on the resource configuration indicated by the indication information.

In addition, when any configuration parameter included in the configuration information includes at least two candidate parameters, the radio access network device may determine a candidate parameter used for each part of data, and the radio access network device sends the indication information carrying a resource configuration corresponding to the candidate parameter used for each part of data to the terminal device. For example, the radio access network device may further indicate, by using the indication information, the terminal device to transmit a part of the data of the V2X service by using LTE V2X, and transmit the other part of the data by using NR V2X. Finally, the terminal device transmits the service data on the sidelink based on the resource configuration indicated by the indication information.

In addition, when any configuration parameter included in the configuration information includes at least two candidate parameters, the radio access network device may determine a target candidate parameter in the at least two candidate parameters, and the radio access network device sends the indication information carrying a resource configuration corresponding to the target candidate parameter to the terminal device. For example, the tx profile of the V2X service is LTE V2X or NR V2X, and the radio access network device determines, for the terminal device, whether LTE V2X or NR V2X is used to transmit the data of the V2X service. When determining that the terminal device uses LTE V2X to transmit the data of the V2X service, the radio access network device generates a resource configuration of LTE V2X for the V2X service of the terminal device. Finally, the terminal device transmits the service data on the sidelink based on the resource configuration indicated by the indication information.

For example, the indication information may include the target candidate parameter determined by the radio access network device in the at least two candidate parameters. In this case, step 103 is specifically the terminal device transmits the service data on the sidelink by using the target candidate parameter.

For example, when any configuration parameter included in the configuration information includes at least two candidate parameters, the radio access network device may determine the target candidate parameter in the at least two candidate parameters, and the radio access network device sends the indication information carrying the target candidate parameter to the terminal device. For example, the mode of NR V2X is the mode 1 or the mode 2. When the radio access network device determines that the terminal device uses an NR V2X mode 2 to transmit the data of the V2X service, and the radio access network device sends the indication information carrying the NR V2X mode 2 to the terminal device, finally, the terminal device transmits the data of the V2X service based on the NR V2X mode 2 indicated by the indication information.

For example, the indication information is used to indicate a candidate parameter selection rule. In this case, step 103 is specifically the terminal device selects the target candidate parameter from the at least two candidate parameters according to the candidate parameter selection rule, and uses the target candidate parameter to transmit the service data on the sidelink.

For example, the candidate parameter selection rule may be that when a CBR (channel busy ratio, channel busy ratio), of an LTE V2X sidelink, obtained by the terminal device through measurement is greater than or equal to a threshold, and/or a CBR, of an NR V2X sidelink, obtained by the terminal device through measurement is less than or equal to a threshold, NR V2X is selected for transmission. When the CBR of the LTE V2X sidelink is less than or equal to the threshold, and/or the CBR of the NR V2X sidelink is greater than or equal to the threshold, LTE V2X is selected for transmission. Finally, the terminal device requests, from the radio access network device based on the determined candidate parameter, a resource for transmitting the data of the V2X service. For example, after selecting the to-be-used candidate parameter, the terminal device requests the resource configuration from the radio access network device, and transmits the data of the V2X service by using the resource configuration sent by the radio access network device. For example, that the terminal device selects a used V2X technology type may be implemented in the following manner. The terminal device directly selects the used technology type, or the terminal device selects the used technology type based on a measurement result of the V2X sidelink. Measurement may be measuring a CBR (channel busy ratio) of the V2X sidelink. For example, the terminal device selects a V2X sidelink with a better CBR measurement result for transmission, or the terminal device selects a currently available V2X sidelink for transmission. For example, if only an NR V2X resource is currently available, NR V2X is used for transmission. For the foregoing scenario in which the terminal device selects the candidate parameter based on the measurement, in this case, the radio access network device may broadcast or send, by using RRC signaling, a set of thresholds to the terminal device. CBR measurement is used as an example. The thresholds may be LTE V2X SL CBR thresholds, or NR V2X SL CBR thresholds, or LTE V2X SL CBR thresholds and NR V2X SL CBR thresholds. That the radio access network device configures the LTE V2X SL CBR threshold for the terminal device is used as an example. If a result, of an LTE V2X SL CBR, obtained by the terminal device through measurement is less than or equal to the LTE V2X SL CBR threshold, the terminal device selects the LTE V2X SL to transmit the data of the V2X service. That the radio access network device configures the NR V2X SL CBR threshold for the terminal device is used as an example. If a result, of an NR V2X SL CBR, obtained by the terminal device through measurement is less than or equal to the NR V2X SL CBR threshold, the terminal device selects the NR V2X SL to transmit the data of the V2X service. That the radio access network device configures the LTE V2X SL CBR threshold and the NR V2X SL CBR threshold for the terminal device is used as an example. If the result, of the LTE V2X SL CBR, obtained by the terminal device through measurement is less than or equal to the LTE V2X SL CBR threshold, and the result of the NR V2X SL CBR is greater than or equal to the NR V2X SL CBR threshold, the LTE V2X SL is selected to transmit the data of the V2X service. If the result, of the LTE V2X SL CBR, obtained by the terminal device through measurement is greater than or equal to the LTE V2X SL CBR threshold, and the result of the NR V2X SL CBR is less than or equal to the NR V2X SL CBR threshold, the NR V2X SL is selected to transmit the data of the V2X service.

In consideration of possible DC (dual connectivity, dual connectivity) and switching scenarios, that the configuration information needs to be exchanged between radio access network devices specifically includes in the DC scenario, a primary radio access network device sends a tx profile to a secondary radio access network device, and in the switching scenario, a source radio access network device sends a tx profile to a target radio access network device.

In this way, the radio access network device obtains the configuration information, where the configuration information is used by the terminal device to transmit the service data on the sidelink, and the configuration information includes any one or more of the following configuration parameters, including the technology type, the air interface, the radio access technology, and the mode that are used by the terminal device to transmit the service data on the sidelink, where the sidelink is a wireless communication link between the terminal device and another terminal device, and the radio access network device generates the indication information based on the configuration information, and sends the indication information to the terminal device, to indicate the terminal device to transmit the service data on the sidelink based on the indication information. In this way, in the prior art, a core network device statically configures a tx profile for the terminal device, and in this application, the radio access network device first obtains the configuration information used by the terminal device to transmit the service data on the sidelink. For example, the configuration information may be configured by the core network device for the terminal device or configured by the radio access network device for the terminal device based on a request of the terminal device. Because the radio access network device can sense a real-time status of the sidelink, the radio access network device may send the indication information to the terminal device based on the configuration information with reference to the real-time status of the sidelink. In this way, the terminal device transmits the service data on the sidelink based on the indication information, to improve transmission quality of the service.

Based on the method described in FIG. 7, before configuring the tx profile for the V2X service of the terminal device, the core network device needs to know a V2X capability supported by the terminal device. For example, whether the terminal device supports LTE V2X and NR V2X is a radio capability of the terminal device. According to the prior art, the core network device cannot parse the radio capability of the terminal device. Therefore, the terminal device needs to report the V2X capability supported by the terminal device to the core network device, so that the core network device generates the configuration information based on the V2X capability supported by the terminal device. For example, the V2X capability supported by the terminal device may have a plurality of dimensions. For example, the V2X capability supported by the terminal device includes the technology type supported by the terminal device. For example, the technology type may include LTE V2X and NR V2X. Optionally, the technology type may include specific version information of the V2X technology, for example, R14 LTE V2X, R15 LTE V2X, R16 NR V2X, and possible subsequent evolved releases, for example, R16 LTE V2X and R17 NR V2X. The V2X capability supported by the terminal device includes a feature of the V2X technology supported by the terminal device. The feature of the V2X technology supported by the terminal device includes one or more of the following, including a modulation technology, a coding technology, an encryption technology, CA (carrier aggregation), and DC that are supported by the V2X technology. If the terminal device reports the feature of the V2X technology and that is supported by the terminal device, a corresponding V2X tx profile may include a V2X feature that needs to be used for the V2X service. For example, some V2X services need to be transmitted by using a specific modulation and demodulation technology, and some V2X services need to be encrypted and transmitted by using a specific encryption technology.

To enable the core network device to know the V2X capability supported by the terminal device, the following several optional manners are available.

The terminal device notifies a control network element of the core network device by using a NAS (Non-access stratum, non-access stratum) message. The terminal device notifies a control function through an interface between the terminal device and the control function. After the terminal device reports the V2X capability supported by the terminal device to the radio access network device, the radio access network device sends, to the core network device, the V2X capability that is supported by the terminal device and that is reported by the terminal device. For example, the radio access network device may notify, through an interface between the radio access network device and the core network device, the core network device of the V2X capability supported by the terminal device.

In addition, before the radio access network device obtains the configuration information of the terminal device, the core network device also needs to know a V2X capability supported by the radio access network device. For example, the V2X capability may be a technology type supported by the radio access network device. For example, the V2X technology type may include LTE V2X and NR V2X. Optionally, the technology type may include specific version information of the V2X technology, for example, R14 LTE V2X, R15 LTE V2X, R16 NR V2X, and possible subsequent evolved releases, for example, R16 LTE V2X and R17 NR V2X. That is, the radio access network device needs to report the supported V2X capability to the core network device. In this way, the core network device is prevented from configuring, for the terminal device, a tx profile that is not supported by the radio access network device. In this way, the core network device generates the configuration information based on the V2X capability supported by the radio access network device and/or the V2X capability supported by the terminal device.

Figure 8:
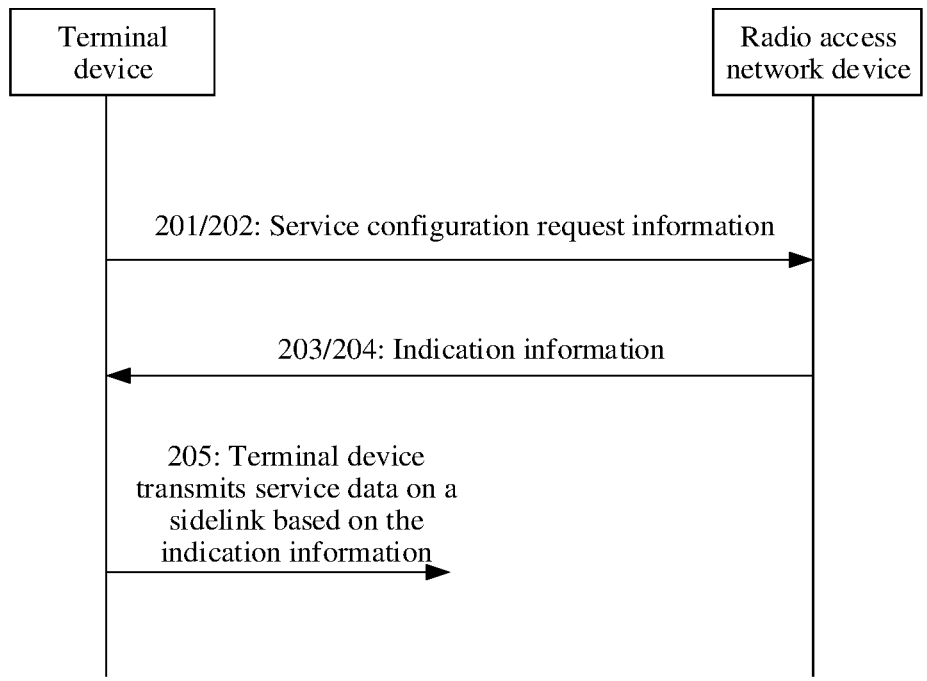
FIG. 8 is a schematic flowchart of a communication method according to another embodiment of this application.

In addition, considering that the core network device may not support all possible V2X services, there may be a V2X service for which no tx profile is configured for the core network device. If the terminal device initiates a V2X service for which no tx profile is configured, the terminal device needs to notify the radio access network device or the core network device of V2X service information, to request the radio access network device or the core network device to allocate a tx profile to the V2X service. Referring to FIG. 8, the following steps are specifically used to implement data transmission.

201: The radio access network device receives service configuration request information sent by the terminal device, where the service configuration request information is used to indicate service information.

The service information may include a service type, a QoS requirement, and the like. The service type may be a destination ID, a PSID, or an ITS-AID mentioned in the foregoing solution, or may be V2I, V2P, V2N, or V2V, or may be a broadcast service, a multicast service, or a unicast service. The QoS requirement may be one or more QoS parameters, and the QoS parameter may be a PPPP, PPPR, a QFI, a 5QI, or the like.

202: The radio access network device generates the configuration information based on the service configuration request information.

203: The radio access network device generates indication information based on the configuration information, and sends the indication information to the terminal device.

204: The terminal device receives the indication information sent by the radio access network device.

205: The terminal device transmits the service data on the sidelink based on the indication information.

In step 203 to step 205 in this solution, the radio access network device may directly send the resource configuration to the terminal device based on the configuration information by using the indication information, for example, as described in Manner 1 or Example 1 in Manner 2. Alternatively, the radio access network device directly sends the configuration information to the terminal device, and the terminal device selects a configuration parameter according to a rule configured by the radio access network device, as described in Example 2 in Manner 2. Details are not described herein again.

Certainly, the terminal device may alternatively report the service configuration request information to the core network device, and the core network device configures the configuration information for the terminal device.

An embodiment of this application provides a communications apparatus. The communications apparatus is a radio access network device or a chip in a radio access network device. The communications apparatus is configured to perform the communication methods provided in the embodiments shown in FIG. 7 and FIG. 8. The communications apparatus provided in this embodiment of this application may include modules corresponding to corresponding steps.

In this embodiment of this application, the communications device may be divided into function modules based on the communication methods provided in the embodiments shown in FIG. 7 and FIG. 8. For example, each function module may be obtained through division based on a corresponding function, or two or more functions may be integrated into one processing module. The integrated module may be implemented in a form of hardware, or may be implemented in a form of a software function module. In the embodiments of this application, module division is an example, and is merely logical function division. During actual implementation, another division manner may be used.

Figure 9:
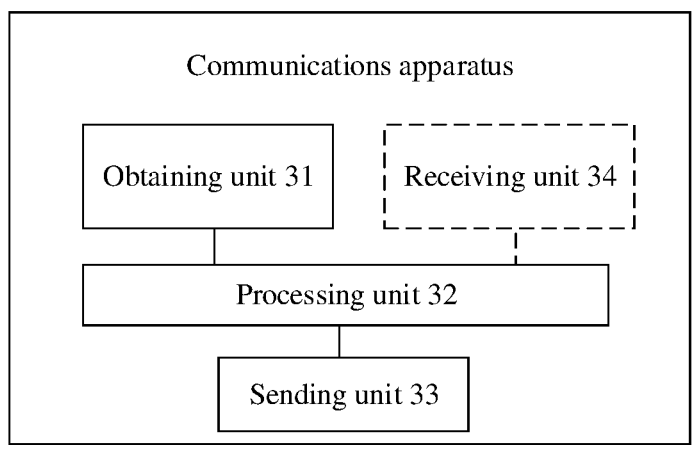
FIG. 9 is a schematic structural diagram of a communications apparatus according to an embodiment of this application.

In a case in which each function module is obtained through division based on each corresponding function, referring to FIG. 9, a manner of performing function module division of a communications apparatus is provided, and the communications apparatus includes an obtaining unit 31, a processing unit 32, and a sending unit 33. Functions implemented by the units and modules provided in this application are specifically as follows. The obtaining unit 31 is configured to obtain configuration information, where the configuration information is used by a terminal device to transmit service data on a sidelink, and the configuration information includes any one or more of the following configuration parameters, including a technology type, an air interface, a radio access technology, and a mode that are used by the terminal device to transmit the service data on the sidelink, where the sidelink is a wireless communication link between the terminal device and another terminal device. The processing unit 32 is configured to generate indication information based on the configuration information obtained by the obtaining unit 31. The sending unit 33 is configured to send the indication information generated by the processing unit 32 to the terminal device, so that the terminal device transmits the service data on the sidelink based on the indication information.

In an example solution, the obtaining unit 31 is specifically configured to receive the configuration information sent by a core network device, or receive the configuration information sent by the terminal device, where the configuration information is sent by the core network device to the terminal device.

In an example solution, the sending unit 33 is further configured to report a V2X capability supported by the radio access network device to the core network device, where the V2X capability supported by the radio access network device includes the technology type supported by the radio access network device, and/or the sending unit 33 is further configured to send, to the core network device, a V2X capability that is supported by the terminal device and that is reported by the terminal device, where the V2X capability supported by the terminal device includes the V2X technology type supported by the terminal device or a feature of a V2X technology supported by the terminal device, and the feature of the V2X technology supported by the terminal device includes any one or more of a modulation and decoding technology, an encoding technology, an encryption technology, carrier aggregation (CA), and dual connectivity DC that are supported by the V2X technology, where the configuration information is determined by the core network device based on the V2X capability supported by the radio access network device and/or the V2X capability supported by the terminal device.

In an example solution, when any one of the configuration parameters included in the configuration information includes at least two candidate parameters, the processing unit 32 is specifically configured to determine a target candidate parameter in the at least two candidate parameters, and the sending unit 33 is specifically configured to send the indication information carrying the target candidate parameter determined by the processing unit to the terminal device, and/or the sending unit 33 is specifically configured to send the indication information carrying a resource configuration corresponding to the target candidate parameter determined by the processing unit to the terminal device.

In an example solution, when any one of the configuration parameters included in the configuration information includes at least two candidate parameters, the processing unit 32 is specifically configured to generate a candidate parameter selection rule based on the configuration information, where the candidate parameter selection rule is used to indicate the terminal device to select a target candidate parameter from the at least two candidate parameters, and the sending unit 33 is specifically configured to send the indication information carrying the candidate parameter selection rule generated by the processing unit to the terminal device.

In an example solution, when any one of the configuration parameters included in the configuration information includes at least two candidate parameters, the processing unit 32 is specifically configured to determine a candidate parameter used by each part of data, and the sending unit 33 is specifically configured to send the indication information carrying a resource configuration corresponding to the candidate parameter that is used by each part of data and that is determined by the processing unit to the terminal device.

In an example solution, a receiving unit 34 is configured to receive service configuration request information sent by the terminal device, where the service configuration request information is used to indicate service information, and the service information includes a service type and/or a QoS requirement, where the obtaining unit 31 is specifically configured to generate the configuration information based on the service configuration request information received by the receiving unit.

Certainly, the communications apparatus provided in this embodiment of this application includes but is not limited to the foregoing modules. For example, the communications apparatus may further include a storage unit. The storage unit may be configured to store program code of the communications apparatus. All related content of the steps in the foregoing method embodiments may be cited in function descriptions of corresponding function modules. Details are not described herein again.

When the communications apparatus is a radio access network device or a chip in a radio access network device, the processing unit 32 may be a processor 61 in FIG. 6, and the sending unit 33 and the receiving unit 34 may be a transceiver 62 in FIG. 6. When the obtaining unit 31 is configured to obtain the configuration information from another device such as a terminal device or a core network device, the obtaining unit 31 may be a transceiver 62 in FIG. 6. Alternatively, when the obtaining unit 31 is configured to generate the configuration information based on the service configuration request information, the obtaining unit 31 may be the processor 61 in FIG. 6. When the communications apparatus runs, the communications apparatus performs the steps performed by the radio access network device in the embodiments corresponding to FIG. 7 and FIG. 8.

An embodiment of this application provides a communications apparatus. The communications apparatus is a terminal device or a chip in a terminal device. The communications apparatus is configured to perform the service data transmission methods provided in the embodiments shown in FIG. 7 and FIG. 8. The communications apparatus provided in this embodiment of this application may include modules corresponding to corresponding steps.

In this embodiment of this application, the communications device may be divided into function modules based on the communication methods provided in the embodiments shown in FIG. 7 and FIG. 8. For example, each function module may be obtained through division based on a corresponding function, or two or more functions may be integrated into one processing module. The integrated module may be implemented in a form of hardware, or may be implemented in a form of a software function module. In the embodiments of this application, module division is an example, and is merely logical function division. During actual implementation, another division manner may be used.

Figure 10:
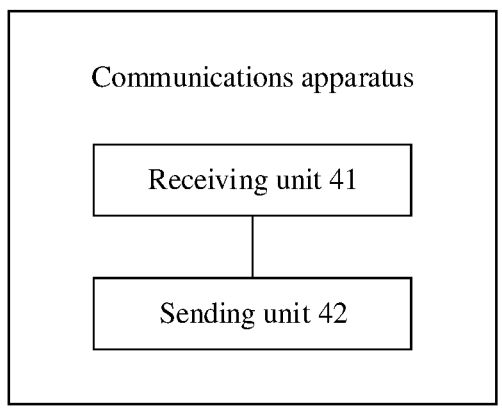
FIG. 10 is a schematic structural diagram of a communications apparatus according to another embodiment of this application.

In a case in which each function module is obtained through division based on each corresponding function, referring to FIG. 10, a manner of performing function module division of a communications apparatus is provided, and the communications apparatus includes a receiving unit 41 and a sending unit 42. Functions implemented by the units and modules provided in this application are specifically as follows. The receiving unit 41 is configured to receive indication information sent by a radio access network device, where the indication information is generated by the radio access network device based on configuration information that is used by the terminal device to transmit service data on a sidelink, and the configuration information includes any one or more of the following configuration parameters, including a technology type, an air interface, a radio access technology, and a mode that are used by the terminal device to transmit the service data on the sidelink, where the sidelink is a wireless communication link between the terminal device and another terminal device. The sending unit 42 is configured to transmit the service data on the sidelink based on the indication information received by the receiving unit 41.

In an example solution, the receiving unit 41 is further configured to receive the configuration information sent by a core network device, and the sending unit 42 is configured to send the configuration information to the radio access network device.

In an example solution, the sending unit 42 is further configured to report a V2X capability supported by the terminal device to the core network device, where the V2X capability supported by the terminal device includes the technology type supported by the terminal device or a feature of a V2X technology supported by the terminal device, and the feature of the V2X technology supported by the terminal device includes any one or more of the following, including a modulation and decoding technology, an encoding technology, an encryption technology, CA, and DC that are supported by the V2X technology, where the configuration information is generated by the core network device based on the V2X capability supported by the terminal device.

In an example solution, the indication information includes a resource configuration used by the terminal device to transmit the service data on the sidelink, and the sending unit 42 is specifically configured to transmit the service data on the sidelink based on the resource configuration.

In an example solution, when any one of the configuration parameters included in the configuration information includes at least two candidate parameters, the indication information includes a target candidate parameter determined by the radio access network device in the at least two candidate parameters, and the sending unit 42 is specifically configured to transmit the service data on the sidelink by using the target candidate parameter.

In an example solution, when any one of the configuration parameters included in the configuration information includes at least two candidate parameters, the indication information is used to indicate a candidate parameter selection rule, and the sending unit 42 is specifically configured to select a target candidate parameter from the at least two candidate parameters according to the candidate parameter selection rule, and transmit the service data on the sidelink by using the target candidate parameter.

In an example solution, the sending unit 42 is further configured to send service configuration request information to the radio access network device, where the service configuration request information is used to indicate service information, and the service information includes a service type and/or a QoS requirement, and the configuration information is generated by the radio access network device based on the service configuration request information.

In an example solution, the sending unit 42 is further configured to send service configuration request information to a core network device, where the service configuration request information is used to indicate service information, and the service information includes a service type and/or a QoS requirement, and the configuration information is generated by the core network device based on the service configuration request information.

Certainly, the communications apparatus provided in this embodiment of this application includes but is not limited to the foregoing modules. For example, the communications apparatus may further include a storage unit. The storage unit may be configured to store program code of the communications apparatus. All related content of the steps in the foregoing method embodiments may be cited in function descriptions of corresponding function modules. Details are not described herein again.

When the communications apparatus is the terminal device or the chip in the terminal device, the sending unit 42 and the receiving unit 41 may be a communications interface or a radio frequency circuit in FIG. 5. When the communications apparatus runs, the communications apparatus performs the steps performed by the terminal device in the communication methods provided in the embodiments shown in FIG. 7 and FIG. 8.

Another embodiment of this application further provides a computer-readable storage medium. The computer-readable storage medium stores an instruction, and when the instruction is run on a communications apparatus, the communications apparatus performs the communication method in the foregoing embodiments.

In another embodiment of this application, a computer program product is further provided. The computer program product includes a computer-executable instruction, and the computer-executable instruction is stored in a computer-readable storage medium. At least one processor of a communications apparatus may read the computer-executable instruction from the computer-readable storage medium, and the at least one processor executes the computer-executable instruction, so that the communications apparatus performs the communication method in the foregoing embodiments.

An embodiment of this application further provides a chip system. The chip system includes a processor, configured to support a communications apparatus in implementing the foregoing communication method. In a possible design, the chip system further includes a memory. The memory is configured to store a program instruction and data of the communications apparatus. Certainly, the memory may alternatively not exist in the chip system. The chip system may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When a computer program instruction is loaded and executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data terminal device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions about implementations allow a person skilled in the art to clearly understand that, for the purpose of convenient and brief description, division of the foregoing function modules is used as an example for illustration. In an actual application, the foregoing functions can be allocated to different modules and implemented as required, that is, an inner structure of an apparatus is divided into different function modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip or the like) or a processor (processor) to perform all or some of the steps of the method described in the embodiments of this application. The storage medium includes any medium such as a USB flash drive, a removable hard disk, a read-only memory (read-only memory, ROM), a random access memory (random access memory, RAM), a magnetic disk, or an optical disc, that can store program code.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, performed by a terminal device or by a chip of the terminal device, the method comprising:
   receiving configuration information from a core network device;
   sending the configuration information to a radio access network device, wherein the configuration information includes one or more configuration parameters, wherein the one or more configuration parameters are used by the terminal device to transmit service data on a sidelink, and wherein the one or more configuration parameters are associated with at least a technology type that is long term evolution (LTE) vehicle-to-everything (V2X) or new radio (NR) V2X;
   receiving, from the radio access network device, indication information that is generated by the radio access network device according to the configuration information, wherein the indication information has a resource configuration of an LTE V2X or NR V2X used by the terminal device to transmit the service data on the sidelink, and wherein the sidelink is a wireless communication link between the terminal device and another terminal device; and
   transmitting the service data on the sidelink based on the indication information.

2. The communication method according to claim 1, further comprising performing, before the receiving the configuration information sent by the core network device:
   reporting, by the terminal device, to the core network device, a vehicle-to-everything (V2X) capability supported by the terminal device, wherein the V2X capability supported by the terminal device comprises a technology type supported by the terminal device or a feature of a V2X technology supported by the terminal device, and wherein the feature of the V2X technology supported by the terminal device comprises one or more a modulation and decoding technology, an encoding technology, an encryption technology, carrier aggregation (CA), or dual connectivity (DC), and wherein the configuration information is associated with the V2X capability supported by the terminal device.

3. A communication method, performed by a radio access network device, the method comprising:
   obtaining, from a terminal device, configuration information, wherein the configuration information includes one or more configuration parameters, wherein the one or more configuration parameters are used by the terminal device to transmit service data on a sidelink, wherein the one or more configuration parameters are associated with at least a technology type that is long term evolution (LTE) V2X or new radio (NR) V2X, and wherein the sidelink is a wireless communication link between the terminal device and another terminal device;
   generating, by the radio access network device, indication information based on the configuration information, wherein the indication information has a resource configuration of an LTE V2X or NR V2X used by the terminal device to transmit the service data on the sidelink; and
   sending, by the radio access network device, the indication information to the terminal device, the indication information indicating, to the terminal device, to transmit the service data on the sidelink based on the indication information;
   wherein the obtaining the configuration information comprises performing at least one of:
      receiving, by the radio access network device, the configuration information sent by a core network device; or
      receiving, by the radio access network device, the configuration information sent by the terminal device, wherein the configuration information is sent by the core network device to the terminal device.

4. The communication method according to claim 3, further comprising performing, before the obtaining the configuration information, at least one of:
   reporting, by the radio access network device, to the core network device, a vehicle-to-everything (V2X) capability supported by the radio access network device, wherein the V2X capability supported by the radio access network device comprises a technology type supported by the radio access network device; or
   sending, by the radio access network device to the core network device, a V2X capability that is supported by the terminal device and that is reported by the terminal device, wherein the V2X capability supported by the terminal device comprises at least one of the technology type supported by the terminal device, or a feature of a V2X technology supported by the terminal device, wherein the feature of the V2X technology supported by the terminal device comprises one or more of a modulation and decoding technology, an encoding technology, an encryption technology, carrier aggregation (CA), and dual connectivity (DC) that are supported by the V2X technology, and wherein the configuration information is determined by the core network device based on at least one of the V2X capability supported by the radio access network device or the V2X capability supported by the terminal device.

5. A communication apparatus comprising:
   at least one processor; and a non-transitory memory storing instructions for execution by the at least one processor, the instructions causing the communications apparatus to act as a terminal device and including instructions for:
  receiving configuration information sent by a core network device;
  sending the configuration information to a radio access network device, wherein the configuration information includes one or more configuration parameters, wherein the one or more configuration parameters are used by the terminal device to transmit service data on a sidelink, and wherein the one or more configuration parameters are associated with at least a technology type that is long term evolution (LTE) vehicle-to-everything (V2X) or new radio (NR) V2X;
  receiving, from the radio access network device, indication information generated by the radio access network device according to the configuration information wherein the indication information has a resource configuration of a LTE V2X or NR V2X used by the terminal device to transmit the service data on the sidelink, and wherein the sidelink is a wireless communication link between the terminal device and another terminal device; and
  transmitting the service data on the sidelink based on the indication information.

6. The communication apparatus according to claim 5, wherein the instructions include instructions for performing, before the receiving the configuration information:
  reporting a vehicle-to-everything (V2X) capability supported by the terminal device to the core network device, wherein the V2X capability supported by the terminal device comprises at least one of the technology type supported by the terminal device or a feature of a V2X technology supported by the terminal device, wherein the feature of the V2X technology supported by the terminal device comprises one or more of a modulation and decoding technology, an encoding technology, an encryption technology, carrier aggregation (CA), or dual connectivity (DC) that are supported by the V2X technology, and wherein the configuration information is associated with the V2X capability supported by the terminal device.

7. A communication apparatus, applied for a radio access network device, comprising:
  at least one processor; and
  a non-transitory memory storing instructions for execution by the at least one processor, the instructions causing the communications apparatus to act as a radio access network device and including instructions for:
    obtaining configuration information, wherein the configuration information includes one or more configuration parameters, wherein the one or more configuration parameters are used by a terminal device to transmit service data on a sidelink, wherein the configuration parameters are associated with at least a technology type that is long term evolution (LTE) V2X or new radio (NR) V2X, and wherein the sidelink is a wireless communication link between the terminal device and another terminal device;
    generating indication information based on the configuration information, wherein the indication information has a resource configuration of a LTE V2X or NR V2X used by the terminal device to transmit the service data on the sidelink; and
    sending the indication information to the terminal device, the indication information indicating to the terminal device to transmit the service data on the sidelink based on the indication information;
  wherein the obtaining the configuration information comprises performing at least one of:
    receiving the configuration information sent by a core network device; or
    receiving the configuration information sent by the terminal device, wherein the configuration information is sent by the core network device to the terminal device.

8. The communication apparatus according to claim 7, wherein the instructions include instructions for performing, before the obtaining the configuration information:
  reporting, to the core network device, a vehicle-to-everything (V2X) capability supported by the radio access network device, wherein the V2X capability supported by the radio access network device comprises a technology type supported by the radio access network device; or
  sending, to the core network device, a V2X capability that is supported by the terminal device and that is reported by the terminal device, wherein the V2X capability supported by the terminal device comprises at least one of the technology type supported by the terminal device or a feature of a V2X technology supported by the terminal device, wherein the feature of the V2X technology supported by the terminal device comprises one or more of a modulation and decoding technology, an encoding technology, an encryption technology, carrier aggregation (CA), and dual connectivity (DC) that are supported by the V2X technology, and wherein the configuration information is determined by the core network device based on at least one of the V2X capability supported by the radio access network device or the V2X capability supported by the terminal device.

* * * * *